(12) United States Patent
Muhammad et al.

(10) Patent No.: US 12,406,511 B2
(45) Date of Patent: Sep. 2, 2025

(54) DETERMINING SCORES INDICATIVE OF TIMES TO EVENTS FROM BIOMEDICAL IMAGES

(71) Applicant: MEMORIAL SLOAN KETTERING CANCER CENTER, New York, NY (US)

(72) Inventors: Hassan Muhammad, New York, NY (US); Chensu Xie, New York, NY (US)

(73) Assignee: Memorial Sloan Kettering Cancer Center, New York, NY (US)

( * ) Notice: Subject to any disclaimer, the term of this patent is extended or adjusted under 35 U.S.C. 154(b) by 556 days.

(21) Appl. No.: 17/901,203

(22) Filed: Sep. 1, 2022

(65) Prior Publication Data

US 2023/0077504 A1  Mar. 16, 2023

Related U.S. Application Data

(60) Provisional application No. 63/240,206, filed on Sep. 2, 2021.

(51) Int. Cl.
G06K 9/00 (2022.01)
G06V 10/764 (2022.01)
G06V 20/69 (2022.01)

(52) U.S. Cl.
CPC .......... *G06V 20/698* (2022.01); *G06V 10/764* (2022.01)

(58) Field of Classification Search
None
See application file for complete search history.

(56) References Cited

U.S. PATENT DOCUMENTS

2023/0289955 A1* 9/2023 Xie ............... G06T 7/0012

OTHER PUBLICATIONS

Muhammad et al., "Unsupervised subtyping of cholangiocarcinoma using a deep clustering convolutional autoencoder" (Year: 2019).*
Andreas Mayr and Matthias Schmid. Boosting the concordance index for survival data—a unified framework to derive and evaluate biomarker combinations. PloS one, 9(1): e84483, 2014.
Brett Delahunt, Rose J Miller, John R Srigley, Andrew J Evans, and Hemamali Samaratunga. Gleason grading: past, present and future. Histopathology, 60(1): 75{86, 2012.

(Continued)

*Primary Examiner* — S J Park
(74) *Attorney, Agent, or Firm* — Foley & Lardner LLP

(57) ABSTRACT

Presented herein are systems and methods for determining scores from biomedical images. A computing system may identify a plurality of tiles in a first biomedical image derived from a sample of a subject. Each tile may correspond to features of the sample. The computing system may apply the plurality of tiles to a machine learning (ML) model. The ML model may include: an encoder to generate a plurality of feature vectors based on the plurality of tiles; a clusterer to select a subset from the plurality of feature vectors; and an aggregator to determine a first score indicative of a time to an event for the subject resulting from the features of the sample. The model may be trained in accordance with a loss derived from second scores determined for second biomedical images. The computing system may store an association between the score and the first biomedical image.

20 Claims, 14 Drawing Sheets

(56) References Cited

OTHER PUBLICATIONS

Chensu Xie, Hassan Muhammad, Chad M. Vanderbilt, Raul Caso, Dig Vijay Kumar Yarlagadda, Gabriele Campanella, and Thomas J. Fuchs. Beyond classification: Whole slide tissue histopathology analysis by end-to-end part learning. In Proceedings of the Third Conference on Medical Imaging with Deep Learning, vol. 121 of Proceedings of Machine Learning Research, pp. 843-856. PMLR, 06{Jul. 8, 2020. URL http: //proceedings.mlr.press/v121/xie20a.html.

Christian Abbet, Inti Zlobec, Behzad Bozorgtabar, and Jean-Philippe Thiran. Divide-and-rule: Self-supervised learning for survival analysis in colorectal cancer. In International Conference on Medical Image Computing and Computer-Assisted Intervention, pp. 480-489. Springer, 2020.

David Faraggi and Richard Simon. A neural network model for survival data. Statistics in medicine, 14(1):73-82, 1995.

Hassan Muhammad, Carlie S Sigel, Gabriele Campanella, Thomas Boerner, Linda M Pak, Stefan B uttner, Jan NM IJzermans, Bas Groot Koerkamp, Michael Doukas, William R Jarnagin, et al. Unsupervised subtyping of holangiocarcinoma using a deep clustering convolutional autoencoder. In International Conference on Medical Image Computing and Computer-Assisted Intervention, pp. 604{612. Springer, 2019.

Jakob Nikolas Kather, Johannes Krisam, Pornpimol Charoentong, Tom Luedde, Esther Herpel, Cleo-Aron Weis, Timo Gaiser, Alexander Marx, Nektarios A Valous, Dyke Ferber, et al. Predicting survival from colorectal cancer histology slides using deep learning: A retrospective multicenter study. PLoS Medicine, 16(1):e1002730, 2019.

Jared Katzman, Uri Shaham, Jonathan Bates, Alexander Cloninger, Tingting Jiang, and Yuval Kluger. Deepsurv: Personalized treatment recommender system using a cox proportional hazards deep neural network. arXiv, pp. arXiv-1606, 2016.

Jiawen Yao, Xinliang Zhu, and Junzhou Huang. Deep multi-instance learning for survival prediction from whole slide images. In International Conference on Medical Image Computing and Computer-Assisted Intervention, pp. 496-504. Springer, 2019.

Olivier Farges, David Fuks, Yves-Patrice Le Treut, Daniel Azoulay, Alexis aurent, Philippe Bachellier, Gennaro Nuzzo, Jacques Belghiti, Francois Rene Pruvot, and Jean Marc Regimbeau. Ajcc 7th edition of tnm staging accurately discriminates outcomes of patients with resectable intrahepatic cholangiocarcinoma: by the afc-ihcc-2009 study group. Cancer, 117(10):2170-2177, 2011.

Pierre Courtiol, Charles Maussion, Matahi Moarii, Elodie Pronier, Samuel Pilcer, Meriem Sefta, Pierre Manceron, Sylvain Toldo, Mikhail Zaslavskiy, Nolwenn Le Stang, et al. Deep learning-based classification of mesothelioma improves prediction of patient outcome. Nature medicine, 25(10):1519-1525, 2019.

Sairam Tabibu, PK Vinod, and CV Jawahar. Pan-renal cell carcinoma classication and survival prediction from histopathology images using deep learning. Scientific reports, 9 (1):1-9, 2019.

Shinichi Aishima, Yousuke Kuroda, Yunosuke Nishihara, Tomohiro Iguchi, Kenichi Taguchi, Akinobu Taketomi, Yoshihiko Maehara, and Masazumi Tsuneyoshi. Proposal of progression model for intrahepatic olangiocarcinoma: clinicopathologic di erences between hilar type and peripheral type. The American Journal of Surgical Pathology, 31(7): 1059{1067, 2007.

Stefan Buettner, Boris Galjart, Jeroen LA van Vugt, Fabio Bagante, Sorin Alexandrescu, Hugo P Marques, Jorge Lamelas, Luca Aldrighetti, T Clark Gamblin, Shishir K Maithel, et al. Performance of prognostic scores and staging systems in predicting long-term survival outcomes after surgery for intrahepatic cholangiocarcinoma. Journal of surgical oncology, 116(8):1085-1095, 2017.

Supriya K Saha, Andrew X Zhu, Charles S Fuchs, and Gabriel A Brooks. Forty-year trends in cholangiocarcinoma incidence in the US: intrahepatic disease on the rise. The Oncologist, 21(5):594-599, 2016.

Tohru Nakajima, Yoichiro Kondo, Masaru Miyazaki, and Katsuji Okui. A histopathologic study of 102 cases of intrahepatic cholangiocarcinoma: histologic classication and modes of spreading. Human Pathology, 19(10): 1228{1234, 1988.

Xinliang Zhu, Jiawen Yao, Feiyun Zhu, and Junzhou Huang. Wsisa: Making survival prediction from whole slide histopathological images. In Proceedings of the IEEE Conference on Computer Vision and Pattern Recognition, pp. 7234-7242, 2017.

* cited by examiner

DETERMINING SCORES INDICATIVE OF TIMES TO EVENTS FROM BIOMEDICAL IMAGES

CROSS REFERENCE TO RELATED APPLICATIONS

The present application claims priority under 35 U.S.C. § 119(e) to U.S. Provisional Patent Application No. 63/240,206, titled "End-to-End Part Inferred Clustering for Survival Analysis, with Prognostic Stratification Boosting," filed Sep. 2, 2021, which is incorporated herein by reference in its entirety.

BACKGROUND

A computing system may use various computer vision techniques to derive information from digital images.

SUMMARY

Aspects of the present disclosure are directed to systems, methods, and computer-readable media for determining scores from biomedical images. A computing system may identify a plurality of tiles in a first biomedical image derived from a sample of a subject. Each tile of the plurality of tiles may correspond to one or more features of the sample. The computing system may apply the plurality of tiles to a machine learning (ML) model. The ML model may include: an encoder having a first plurality of weights to generate a plurality of feature vectors based on the plurality of tiles; a clusterer having a plurality of centroids defined in a feature space to select a subset of feature vectors from the plurality of feature vectors; and an aggregator having a second plurality of weights to combine the subset of feature vectors to determine a first score indicative of a time to an event for the subject resulting from the one or more features of the sample from which the first biomedical image is derived. The model may be trained in accordance with a loss derived from a second plurality of scores determined for a corresponding second plurality of biomedical images. The computing system may store, in one or more data structures, an association between the score and the first biomedical image.

In some embodiments, the computing system may provide information based on the association between the score and the first biomedical image. In some embodiments, the computing system may obtain the first biomedical image of the sample on a slide acquired via a histopathological image preparer. In some embodiments, the computing system may receive, via a user interface, a selection of the plurality of tiles corresponding to the one or more features in the respective sample.

In some embodiments, the clusterer may identify at least one feature vector to include in the subset of feature vectors based on a comparison between the at least one feature vector and a corresponding centroid of the plurality of centroids. In some embodiments, the aggregator may determine the first score indicative of a probability of survival of the subject by time resulting from the one or more features of the sample. In some embodiments, the ML model may be trained in accordance with a second loss based on a comparison between the second plurality of scores and a third plurality of scores identified for the second plurality of biomedical images in a training dataset.

Aspects of the present disclosure are directed to systems, methods, and computer-readable media for training models to determine scores from biomedical images. A computing system may identify a training dataset for each biomedical image of a plurality of biomedical image. The training dataset may include a plurality of tiles in the biomedical image derived from a respective sample of a corresponding subject. Each tile of the plurality of tiles may correspond to one or more features in the respective sample. The computing device may apply the plurality of tiles from each biomedical image to a machine learning (ML) model. The ML model may include: an encoder having a first plurality of weights to generate a plurality of feature vectors based on the plurality of tiles; a clusterer having a plurality of centroids defined in a feature space to select a subset of feature vectors from the plurality of feature vectors; and an aggregator having a second plurality of weights to combine the subset of feature vectors to determine a score indicative of a time to an event for the corresponding subject. The computing system may determine a loss based on the score determined for each of the plurality of biomedical images. The computing system may update using the loss, at least one of the first plurality of weights of the encoder, the plurality of centroids of the clusterer, or the second plurality of weights of the aggregator. The computing system may store, in one or more data structures, the first plurality of weights of the encoder, the plurality of centroids of the clusterer, and the second plurality of weights of the aggregator.

In some embodiments, the training dataset further comprises a second score indicative of the time to the event for the corresponding subject resulting from the one or more features in the respective sample. In some embodiments, the computing system may determine the loss based on a comparison between the score and the second score determined for the corresponding biomedical image.

In some embodiments, the computing system may identify, from a plurality of scores comprising the score determined for each of the plurality of biomedical images, (i) a first value corresponding to a first subset of the plurality of scores and (ii) a second value corresponding to a second subset of the plurality of scores. In some embodiments, the computing system may determine the loss as a function of the first value and the second value. In some embodiments, the computing system may determine the loss as a function of a modification of the plurality of centroids defined in the feature space of the clusterer.

In some embodiments, the clusterer may identify at least one feature vector to include in the subset of feature vectors based on a comparison between the at least one feature vector and a corresponding centroid of the plurality of centroids. In some embodiments, the aggregator may determine the score indicative of a probability of survival of the subject by time resulting from the one or more features of the sample. In some embodiments, the computing system may receive, via a user interface, for at least one of the plurality of biomedical images, a selection of the plurality of tiles corresponding to the one or more features in the respective sample.

DETAILED DESCRIPTION

Figure 1:
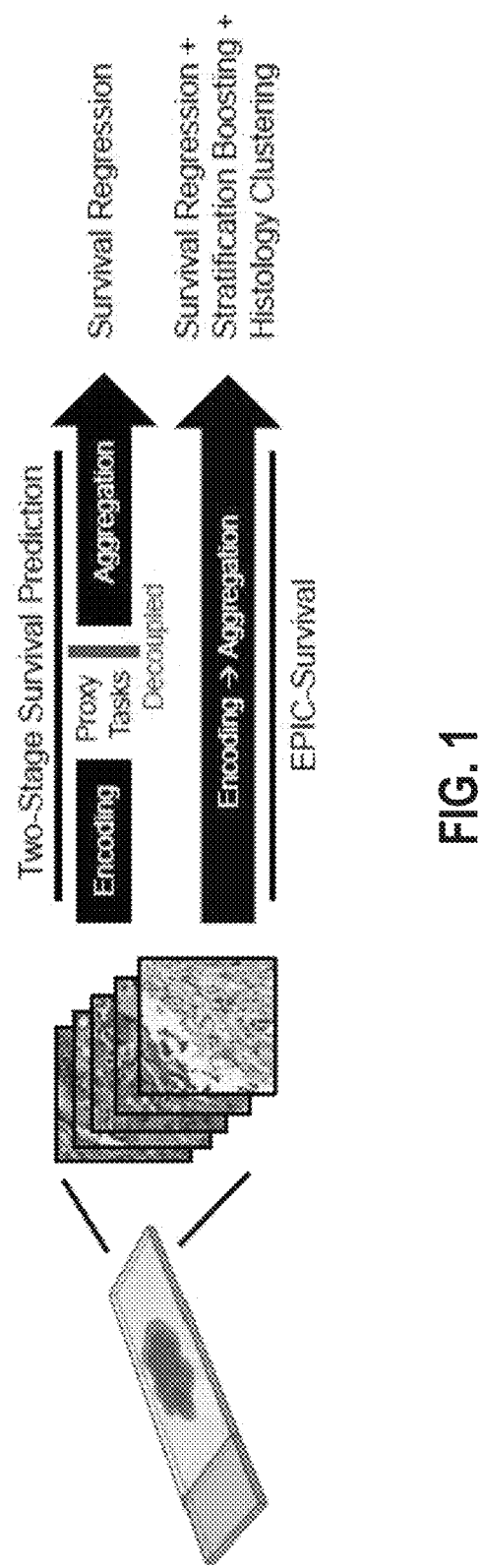
FIG. 1: EPIC-Survival introduces end-to-end learning for prognostic prediction.

Following below are more detailed descriptions of various concepts related to, and embodiments of, systems and methods for determining scores from biomedical images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes end-to-end inferred clustering for survival analysis with prognostic stratification boosting.

Section B describes systems and methods for determining scores indicative times to events from biomedical images.

Section C describes a network environment and computing environment which may be useful for practicing various computing related embodiments described herein.

A. End-to-End Inferred Clustering for Survival Analysis with Prognostic Stratification Boosting 1. Introduction Histopathology-based survival modelling has two major hurdles. Firstly, a well-performing survival model has minimal clinical application if it does not contribute to the stratification of a cancer patient cohort into different risk groups, preferably driven by histologic morphologies. In the clinical setting, individuals are not given specific prognostic predictions, but are rather predicted to lie within a risk group which has a general survival trend. Thus, it is imperative that a survival model produces well-stratified risk groups. Secondly, until now, survival modelling was done in a two-stage approach (encoding and aggregation). EPIC-Survival bridges encoding and aggregation into an end-to-end survival modelling approach, while introducing stratification boosting to encourage the model to not only optimize ranking, but also to discriminate between risk groups. In the present disclosure, it shows that EPIC-Survival performs better than other approaches in modelling intrahepatic cholangiocarcinoma (ICC), a historically difficult cancer to model. It was found that stratification boosting further improves model performance and helps identify specific histologic differences, not commonly sought out in ICC.

Cancer subtyping has shown to be uniquely powerful for survival analysis by many works. Because traditional methods used for discovering cancer subtypes are extremely labor intensive and subjective, successful stratification of common cancers, such as prostate, into effective subtypes has only been possible due to the existence of large datasets. However, working with rare cancers poses its own set of challenges. Further, histologic features are limited to the discretion of the manual observer's past experiences and subjectivity. EPIC-Survival offers a way to standardize cancer subtyping and discover new histologic features, as a unique deep learning-based survival model which overcomes two key barriers.

Firstly, even the best performing survival models are not useful unless they can provide stratified patient groups. It is difficult to computationally predict the specific outcome of an individual patient. It is more reasonable to predict the subgroup of a cancer population in which an individual patient falls into. Further, without a robust prognostic model which learns the population dynamics between histology and patient outcome or treatment prediction, survival models have minimal use. Thus, it is important that a survival model produces stratified groups, preferably driven by histology, rather than simply performing well at ranking patients by risk. Regardless, survival modelling based on whole slide image (WSI) histopathology is a difficult task which requires overcoming a second problem.

Because a single digitized WSI can span billions of pixels, it is impossible to directly use WSIs in full to train survival models, given current technological constraints. Thus, it is a common technique to sample tiles from WSIs, often in creative ways, and then aggregating them to represent their respective WSIs in the final step of training. These stages can be simplified as the tile encoding stage and the aggregation stages. While the aggregation stage of survival modelling has historically defaulted to the Cox-proportional Hazard regression model, recent advancements have made survival modelling more robust to complex data. Some examples are highlighted in the next section. Nevertheless, creative ways to extract features from WSIs and more advanced techniques to aggregate them still face the limits of operating in detached two-stage frameworks, in which the information at slide level, e.g. the given patient prognosis, is never taken into consideration while learning tile encoding by proxy tasks (cf. FIG. 1). This creates a difficulty in being able to confidently identify specific and direct relationships between tissue morphology and patient prognosis, even though prognostic performance may be strong.

In this disclosure, a deep convolutional neural network which utilizes end-to-end training to directly produce survival risk scores for a given WSI without limitations on image size, is introduced. Further, a loss function called stratification boosting (SB) is developed, which further strengthens risk group separation and overall prognostic performance. The introduction of SB not only improves overall performance, but also forces the model to identify risk groups. In contrast, other works attempt to find groups in the distribution of ranking after modelling a dataset. This model takes one step closer to systematically mapping out the relationships between tissue morphology and patient death or cancer recurrence times. To challenge this method, the difficult case of small dataset rare cancers was considered.

1.1. Cholangiocarcinoma cholangiocarcinoma (ICC), a cancer of the bile duct, has an incidence of approximately 1 in 160,000 in the United States. In general, the clinical standard for prognostic prediction and risk-based population stratification relies on simple metrics which are not based on histopathology. These methods have unreliable prognostic performances, even when studied in relatively large cohorts (1000+ samples). Studies which have attempted to stratify ICC into different risk groups based on histopathology have been inconsistent and unsuccessful.

1.2. Other Approaches and Methods

Because survival analysis continues to operate in a two-stage approach as outlined above, advancements in survival analysis largely lie in the feature extraction front. A deep unsupervised clustering autoencoder which stratified a limited set of tiles randomly sampled from WSIs into groups based on visual features at high resolution may be introduced. These clusters were then visualized and used as covariates to train simple univariate and multivariate CPH models. Similarly, in another approach, self-supervised clustering was used to produce subtypes based on histologic features. These were then visualized and used as covariates in survival models to measure significance of the clustered morphologies. Another method takes the clustering approach one step further by modeling local clusters for a tile-level prediction before aggregating the results into slide-level survival predictions. These methods work to build visual dictionaries through clustering without having direct association to survival data. Slightly differently, another approach developed a method to build a visual dictionary through multiple instance learning. Though not completely unsupervised, even weak supervision can only operate with a decoupled survival regression. Other approaches have used even simpler approaches, producing models which learn to predict prognosis on tiles based on slide-level outcomes and then aggregate them into a slide-level predictions. These models, however, do utilize the DeepSurv function, a neural-network based survival learning loss robust to complex and non-linear data (discussed further in section 2.2). Unfortunately, the simplified feature extraction methods of the works listed do not allow the DeepSurv model to operate in its fullest potential—this method overcomes that barrier.

Another approach bridged the gap of the two-stage problem in WSI classification tasks with the introduction of End-to-end Part Learning (EPL). EPL maps tiles of each WSI to k feature groups defined as parts. The tile encoding and aggregation are learned together against slide label in an end-to-end manner. Although the authors suggested that EPL is theoretically applicable to survival regression, treatment recommendation, or other learnable WSI label predictions, the effort has been limited to testing the EPL framework with experiments benchmarking against classification datasets. Presented in this disclosure is the EPIC-Survival to extend the EPL method to survival analysis by integrating the DeepSurv survival function, unencumbered by the limitations of two-stage training. Moreover, contributing a new concept called stratification boosting, which acts as a critical loss term to the learning of distinct risk groups among the patient cohort.

EPIC-Survival bridges encoding and aggregation into an end-to-end survival modelling approach, while introducing stratification boosting to encourage the model to not only optimize ranking, but also to discriminate between risk groups. In the present disclosure, it is shown that EPIC-Survival performs better than other approaches in modelling intrahepatic cholangiocarcinoma (ICC), a historically difficult cancer to model. It was found that stratification boosting further improves model performance and helps identify specific histologic differences, not commonly sought out in ICC 2. Methods 2.1. Survival Modelling Survival modelling is used to predict ranking of censored time-duration data. A sample is defined as censored when the end-point of its given time duration, or time-to-event, is not directly associated to the study. For example, in a dataset of time-to-death by cause of cancer, not all samples will have end-points associated with a cancer-related death. In some cases, an end-point may indicate a patient dropping out of the study or dying of other causes. Rather than filtering out censored samples and regressing only on uncensored time-to-events, Cox-proportional hazard (CPH) models are used to regress on a complete dataset and predict hazard, the instantaneous risk that the event of interest occurs. CPH as defined as:

$$\lambda(t) = \lambda_o e^{\beta_i v_i}, \qquad (1)$$

where $\lambda(t)$ is the hazard function dependent on time t, $\lambda_o$ is a baseline hazard, and some covariate(s) $v_i$ are weighted by coefficient(s) $\lambda_i$.

DeepSurv made an advancement in survival modelling by using a neural network to regress survival data based on theoretical work. Their results showed better performance than the typical CPH model, especially on more complex data. In the case of a neural network-based survival function, $\beta_i$ is substituted for model parameters, $\theta$, i.e. $\beta_i v_i \rightarrow f_\theta(S)$, where S represents the input slide image. Traditionally, a negative log partial likelihood (NLPL) is used to optimize the survival function. It is defined as:

$$NLPL(f_\theta(S), d, e) = -\sum_{i:E_i=1} \left( f_\theta(S_i) - \log \sum_{j \in \Re_i} e^{f_\theta(S_j)} \right), \qquad (2)$$

where $f_\theta(S_i)$ is the output risk score for slide i, d and e are respective duration and event indicator, $f_\theta(S_j)$ is a risk score from ordered set $\Re$ $(T_i)$=i: $T_i \geq t$ of patients still at risk of failure at time t, and i: $E_i=1$ is the set of samples with an observed event (uncensored). The performance of a CPH or CPH-based model can be tested using a concordance index (CI) which compares the ranking of predicted risks to associated time-to-events. A CI of 0.5 indicates randomness and a CI of 1.0 indicates perfect prognostic predictions.

Further, the Kaplan-Meier (KM) method can be used to estimate a survival function, the probability of survival past time t, allowing for an illustrative way to see prognostic stratification between two or more groups. The survival function is defined as:

$$S(t) = \prod_{t_i < t} \frac{n_i - o_i}{n_n}, \quad (3)$$

where $o_i$ are the number of observed events at time t and $n_i$ are the number of subjects at risk of death or recurrence prior to time t. The Log-Rank Test (LRT) is used to measure significance of separation between two survival functions modelled using KM. LRT is a special case of the chi-squared test used to test the null hypothesis that there is no difference between the S(t) of two populations.

2.2. EPIC Survival

Figure 2:
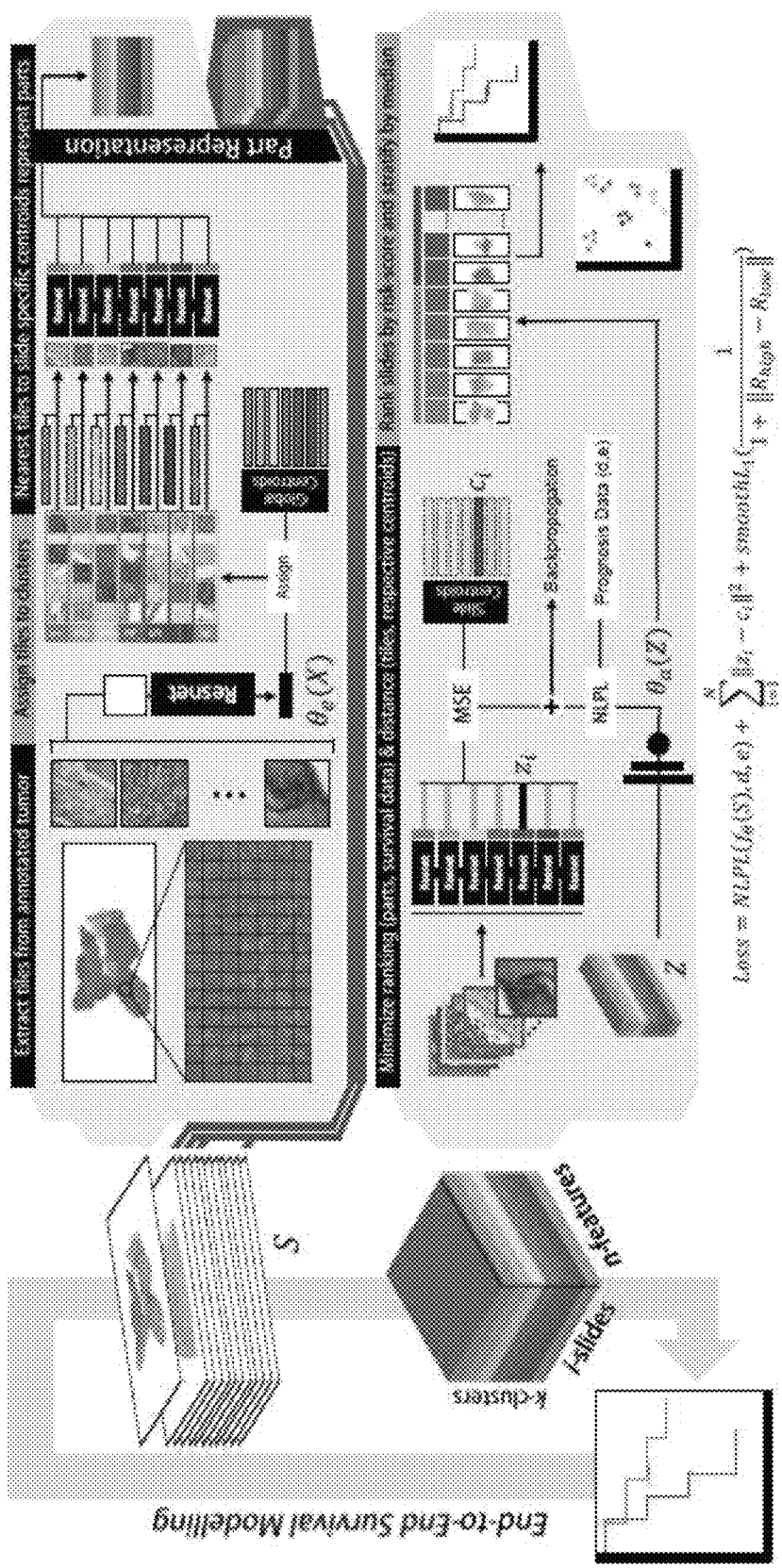
FIG. 2: Diagram of the proposed EPIC-Survival approach for prognosis prediction. Top: Whole slide images are tiled into small patches which pass through an ImageNet ResNet-34 backbone, outputting a tile feature vector. Each vector is assigned to a histology feature group defined by global centroids. Next, local slide-level centroids are calculated and the nearest tiles to k local centroids are used as part representations of the slide. This process is repeated for all slides. Bottom: Still within the same training epoch, parts of all slides are concatenated and trained with survival data, in conjunction with optimizing local clustering and overall risk group separation. Note: Global centroids are randomly initialized before training and updated between epochs, based on the optimization of the ResNet-34 backbone.

EPIC-Survival bridges the DeepSurv loss with the comprehensive framework of EPL. EPL models each WSI as k groups of tiles with similar features, defined as parts, and backpropagates the loss against slide labels (time-to-event data) through the integrated encoding-aggregation graph, in which k encoders ($\theta_e$) take in part representative tiles (X) and output part features ($z_i$) that are then concatenated and fed through a single fully connected aggregation layer ($\theta_a$). In each iteration, model weights were optimized and thus the centroid feature ($z_k=1/N \sum_{n=1}^{N} \theta_a(x_{k,n})$) for each part was modified, then a tiles will be reassigned to parts and a different representative tile for each part will be selected for next iteration. For EPIC-Survival, the last fully connected layer of the original EPL was replaced by a series of fully connected layers and a single output node which functions as a risk score for a given input WSI. Similar to the traditional EPL, NLPL is combined with a clustering function based on minimizing distances between a sample embedding and its assigned centroid:

$$Loss = NLPL(f_\theta(S), d, e + \lambda_c \sum_{i=1}^{N} \|z_i - c_i\|^2, \quad (4)$$

where $z_i$ is the embedding of tiles sample from cluster i, $c_i$ is the part centroid from which $z_i$ is sampled, and $\pi_c$ is a weighting parameter. FIG. 2 visualizes this combined loss function, and slide-level and global clustering of visual morphology.

2.3. Stratification Boosting

While CPH and DeepSurv regressions serve to optimize the ranking of samples in relation to time-to-event data, they do not actively form risk groups within a dataset. In other approaches on CI-based learning, it is concluded that prediction rules that are well calibrated do not have a high discriminatory power, and vice versa. One of the most important applications of survival analysis is cancer subtyping, an important tool used to help predict disease prognosis and direct therapy. Moreover, subtyping based on survival analysis creates a functional use for the survival model, especially if specific morphologies can be identified within each prognostic group. The DeepSurv loss, which only optimizes ranking, does not explicitly put a lower bound to the separation between the predicted risks. To further improve prognostic separation between high and low risk groups in the patient population, the DeepSurv-EPL function was extended with a stratification loss term. During training, predicted risks are numerically ordered and divided into two groups based on the median predicted risk. The mean is calculated for each group of predicted risks ($R_{high}$ and $R_{low}$) and the model is optimized to diverge the two values using Huber loss smoothL1($1/(1+|R_{high}-R_{low}|)$, 0).

2.4. Dataset

WSIs of ICC cases were obtained from Memorial Sloan Kettering Cancer Center (MSKCC), Erasmus Medical Center-Rotterdam (EMC), and University of Chicago (UC) with approval from each respective Institutional Review Boards. In total, 265 patients with resected ICC without neoadjuvant chemotherapy were included in the analysis. Up-to-date retrospective data for recurrence free survival after resection was also obtained. A subset of samples (n=157) from MSKCC were classified into their respective AJCC TNM and P-Stage groups. 246 slides from MSKCC and EMC were used as training data, split into five folds for cross validation. 19 slides from UC were set aside as an external held-out test set. Using a web-based whole slide viewer developed by this group, areas of tumor were manually annotated in each WSI. Using a touchscreen tablet and desktop (Surface Pro 3, Surface Studio; Microsoft Inc.), a pathologist painted over regions of tumor to identify where tiles should be extracted for training. Tiles used in training were extracted from tumor-regions of tissue and sampled at 224×224px, 20× resolution.

2.5. Architecture and Experiments

An ImageNet ResNet-34 was used as the base feature extractor ($\theta_e$). A series of three wide fully connected layers (4096, 4096, 256) with dropout were implemented before the single risk output node. Model hyperparameters (number of clusters, waist size, part-batch size, learning rate, dropout rate, and top-k tiles respectively) were optimized using random grid search and CI as a performance metric at the end of each epoch. 16 clusters and a waist size of 16 produced the best performance. The same 5-fold cross validation was implemented and held throughout all experiments and models. Predicted risks of the validation sets from each fold were concatenated for a complete performance analysis using CI and LRT. Each model was subsequently trained using all training data, tested on the held-out test set, and evaluated using CI and LRT.

As a baseline, Deep Clustering Convolutional Autoencoder was implemented. This model was chosen because, like EPIC-Survival, it uses clustering to define morphological features. However, these features are learned based on image reconstruction and then used as covariates in traditional CPH modelling, as a representation for the classic two-stage approach. Further, the subset of training data with AJCC staging, a clinical standard, was analyzed using a 4-fold cross validation and CPH.

3. Results

EPIC-Survival with and without SB performed similarly on the 5-fold cross validation producing CI of 0.671 and 0.674, respectively. On the held out test set, EPIC-survival with SB performed significantly better with a CI of 0.880, compared to a CI of 0.652 without SB. Unsupervised clustering with a traditional CPH regression yielded a CI of 0.583 on 5-fold cross validation and 0.614 on the test set. Table 1 summarizes these results.

AJCC staging using the TRN and P-stage protocols on the subset of ICC produced CIs of 0.576 and 0.638, respectively. While it is recognized that a CI produced on a subset of data may produce biases from batch effects, these results are not different from the results of a study which tested multiple prognostic scores on a very large ICC cohort (n=1054).

Figure 3:
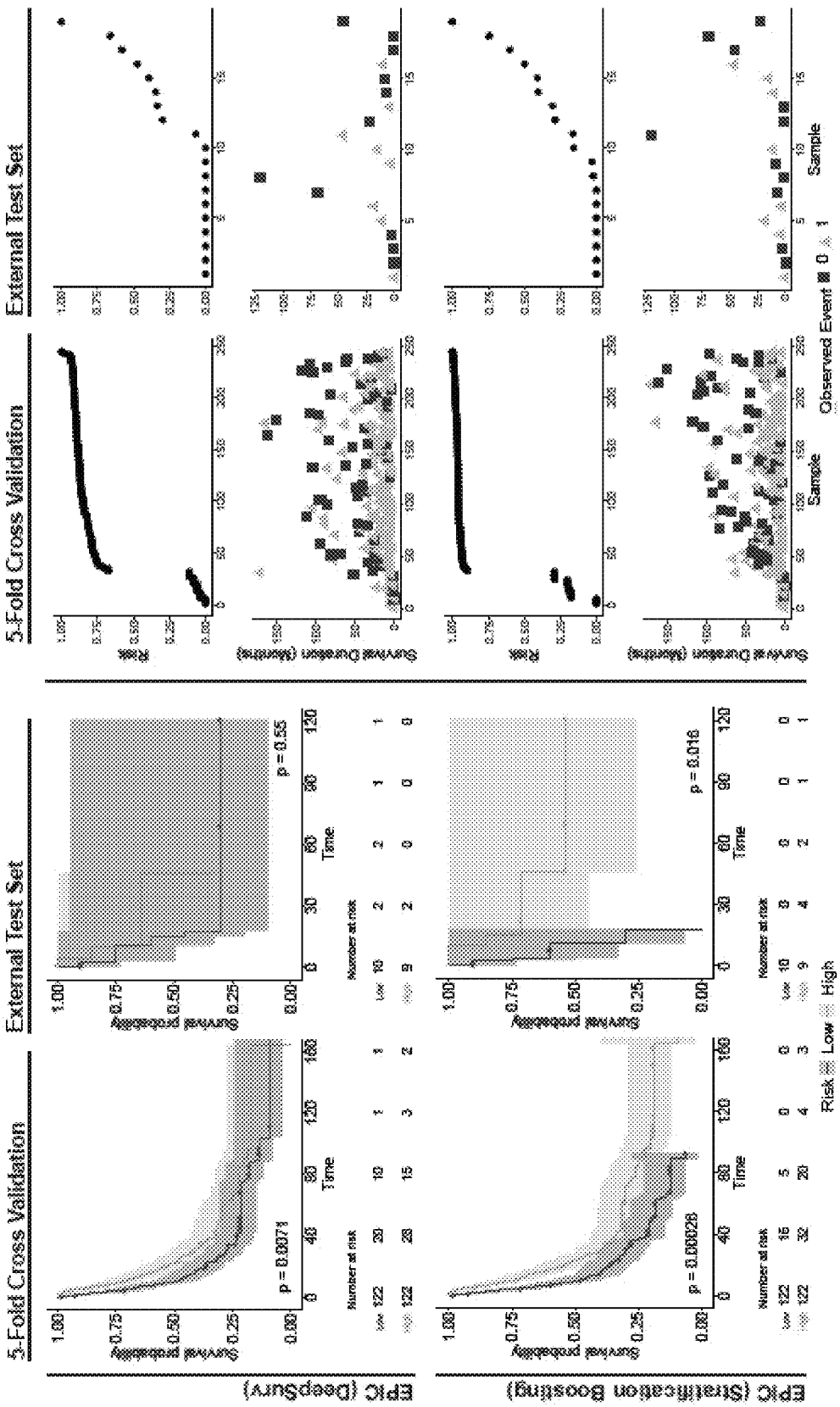
FIG. 3: Left: EPIC-Survival without stratification successfully stratifies (LRT: $p<0.05$) the patient population into high and low risks on 5-Fold Cross Validation but fails on the held out test set. Stratification boosting (SB) produces strong patient population separation on both 5-Fold Cross Validation and the External Test Set. Right: The distribution of time-to-events relative was visualized to predict the risk scores that were ordered from low to high. EPIC-Survival, in general, does well at predicting early recurrence. The inclusion of SB improves the correlation between predicted risk values and patient outcome.
Figure 4:
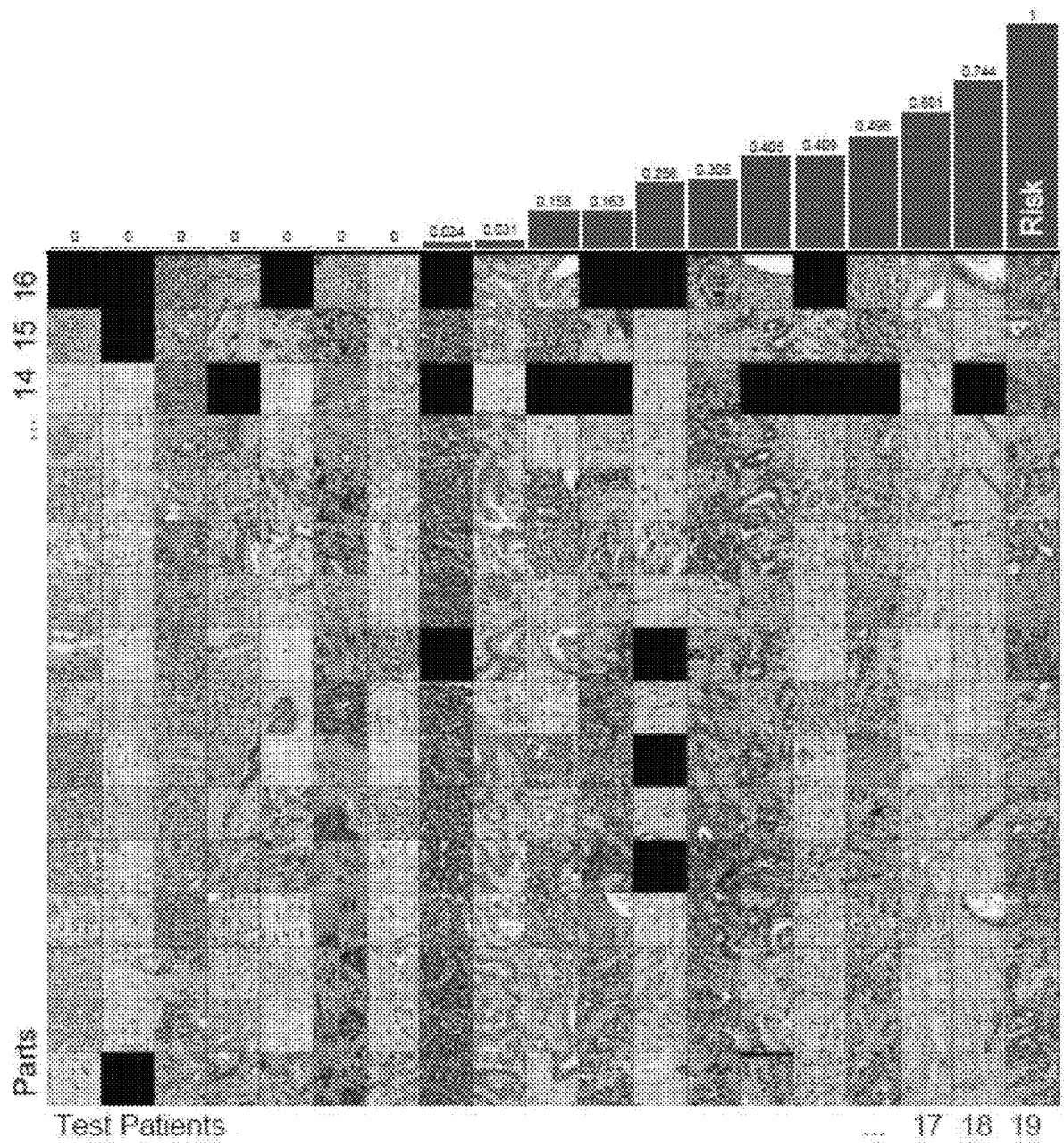
FIG. 4: Rows: Slide parts, Columns: Patients with their predicted risk scores highlighted above. Black tiles indicate that there was no assigned tile to that part of a slide.

In a KM analysis (FIG. 3), EPIC-Survival with SB showed significant separation between high and low risk populations (p<0.05). Epic-Survival without SB failed on the held out test set. Although stratification on the 5-fold cross validation is assumed significant, there remains a risk of crossing survival curves, breaking the assumption of proportional hazard rates.

To further analyze results, the distribution of predicted risks relative to the distribution of time-to-events (FIG. 3) was visualized. Findings show that EPIC-Survival with and without SB performs well at predicting early recurrence (<50 months). Correlation between predicted risks and time durations of the external test set using EPIC-Survival with SB is very strong, as further indicated by the strong CI of 0.880.

|  | Cross Validation | Test |
|---|---|---|
| AJCC TNM | 0.576 (n = 157) | — |
| AJCC P-Stage | 0.638 (n = 157) | — |
| Muhammad et. al. | 0.583 (n = 244) | 0.614 (n = 19) |
| EPIC (DeepSurv) | 0.671 (n = 244) | 0.652 (n = 19) |
| EPIC (Stratification Boosting) | 0.674 (n = 244) | 0.880 (n = 19) |
| AJCC TNM | — | 0.582 (n = 1054) |
| Wang Nomogram | — | 0.607 (n = 1054) |
| LCSGj | — | 0.562 (n = 1054) |
| Okabayashi | — | 0.557 (n = 1054) |
| Nathan Staging | — | 0.581 (n = 1054) |
| Hyder Nomogram | — | 0.521 (n = 1054) |

Table 1: EPIC-Survival with stratification boosting showed the best CI-based performance. For reference, performance of various clinical metrics on a very large ICC dataset (n=1054) are provided.

In Appendix A, part representation (rows) in each slide (columns) from the test set was visualized. The slides are ordered by predicted risk scores. A gastrointestinal pathologist reviewed these and discovered some general trends indicating that tiles with a low predicted risk (earlier rate of recurrence) tended to have loose, desmoplastic stroma with haphazard, delicate collagen fibers, whereas high risk tiles (later recurrence) tended to have dense intratumoral stroma with thickened collagen fibers. The quality of nuclear chromatin was vesicular more commonly in the low risk tiles. The quality of the intratumoral stroma has never been a part of tumor grading or observed as a prognostic marker. Further, there is no grading scheme that involves assessment of nuclear features for ICC.

4. Conclusion

Test results show a significantly higher CI than the cross validation experiments. It was found that CI on smaller sets are often larger because correctly ranking a smaller set of data is easier. During hyperparameter optimization, this was also observed in the case of batch sizes. Smaller batch sizes produces better CIs—in other words, optimizing the ranking of smaller batches was easier than optimizing the ranking in larger batches.

EPIC-Survival has the capacity to identify specific risk factors in histology, though these morphologies would need further testing on a larger study. It was hypothesized that altering the SB component of the loss function to push separation between >2 groups would further improve performance and has the potential to function as a general subtyping model.

The contributions are threefold: (1) introducing the first end-to-end survival model, overcoming the information decoupling-limitation of two-stage approaches; (2) contributing a new loss term to strengthen the traditional hazard regression and encourage the learning of stratified risk groups; (3) showing the power of EPIC-Survival by applying it to the difficult test case of ICC, surpassing other metrics and providing insight into new histologic features which may unlock new discoveries in ICC subtyping.

B. Systems and Methods for Determining Scores from Biomedical Imaging

Figure 5:
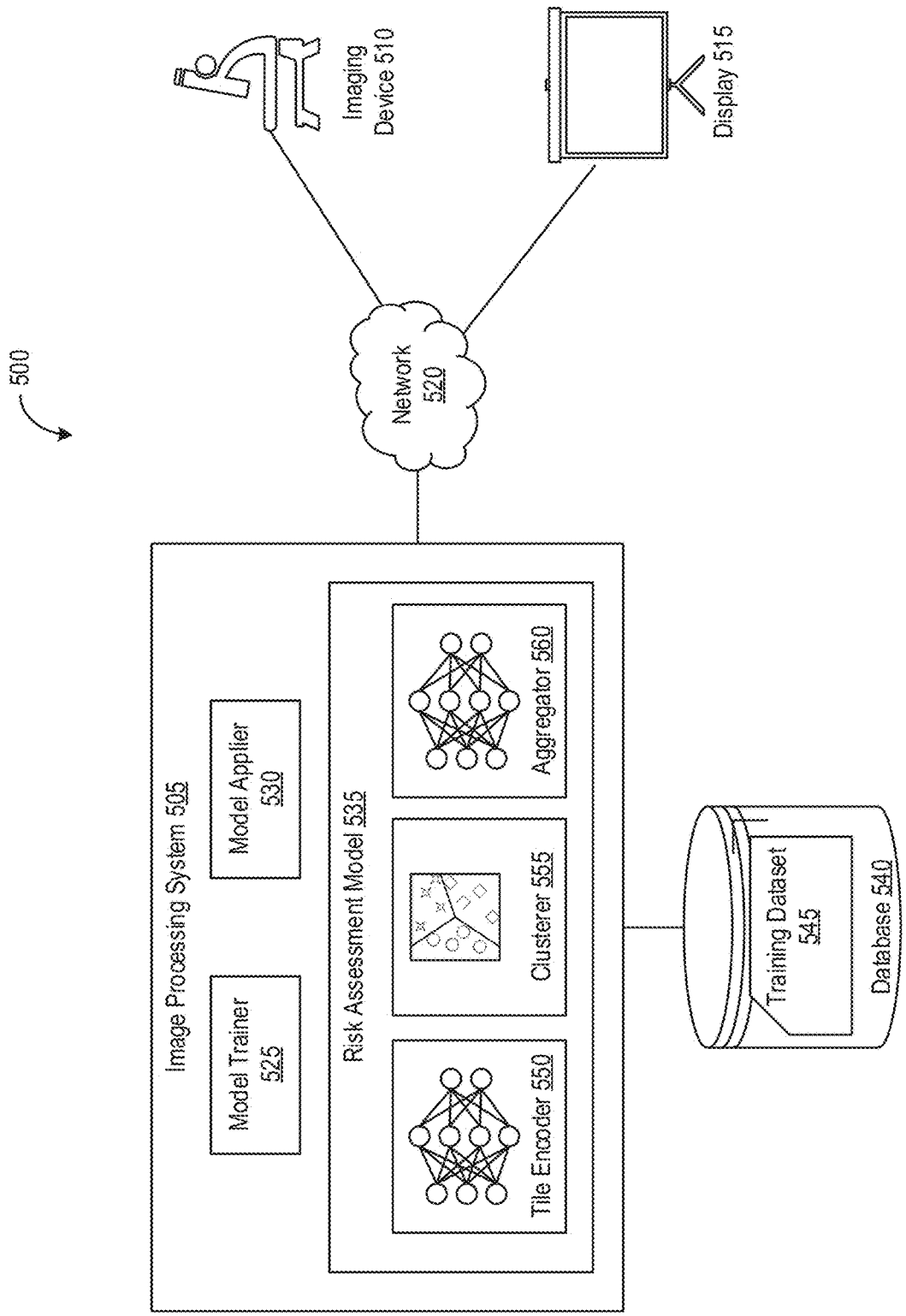
FIG. 5 depicts a block diagram of a system for determining scores indicative of times to events from biomedical images, in accordance with an illustrative embodiment.

Referring now to FIG. 5, depicted is a block diagram depicting a system 500 for determining scores from biomedical images. In overview, the system 500 may include at least one image processing system 505, at least one imaging device 510, and at least one display 515, among others, communicatively coupled via at least one network 620. The image processing system 505 may include at least one model trainer 525, at least one model applier 530, at least one assessment model 535 (sometimes referred herein as a survival model or survival prediction model, or generally as a machine learning (ML) model), and at least one database 540, among others. The database 540 may store, maintain, or otherwise include at least one training dataset 545. The risk assessment model 535 may include at least one tile encoder 550, at least one clusterer 555, and at least one aggregator 560, among others. Each of the components in the system 500 as detailed herein may be implemented using hardware (e.g., one or more processors coupled with memory) or a combination of hardware and software as detailed herein in Section C. Each of the components in the system 500 may implement or execute the functionalities detailed herein, such as those described in Section A.

In further detail, the image processing system 505 itself and the components therein, such as the model trainer 525, the model applier 530, and the risk assessment model 535 may have a training mode and a runtime mode (sometimes herein referred to as an evaluation or inference mode). Under the training mode, the image processing system 505 may invoke the model trainer 525 to train the risk assessment model 535 using the training dataset 545. Under the runtime, the risk assessment model 535 may invoke the model applier 530 to apply the risk assessment model 535 to new incoming biomedical images from the imaging device 510.

Figure 6:
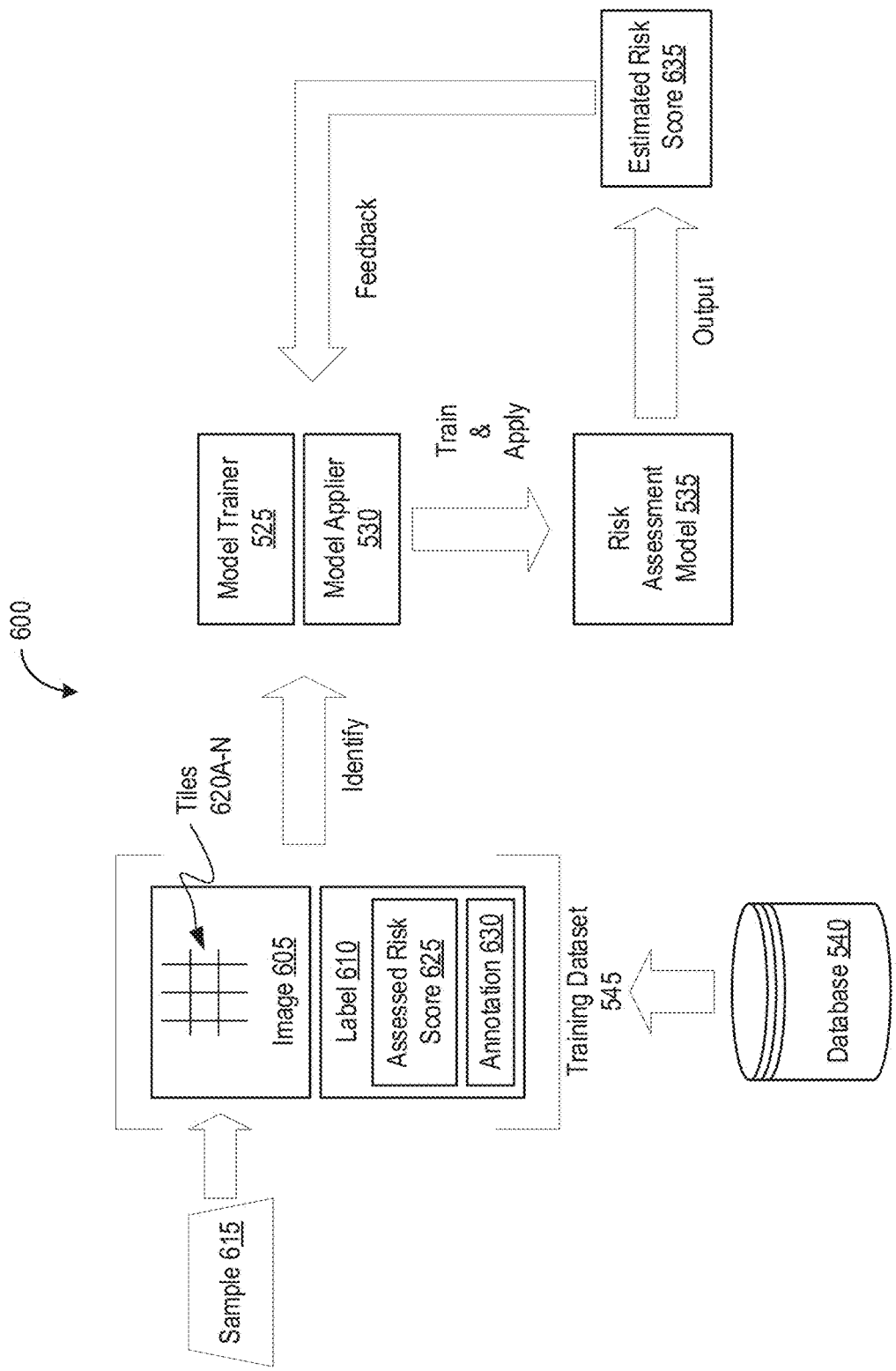
FIG. 6 depicts a block diagram of a process for training in the system for determining scores, in accordance with an illustrative embodiment.

Referring now to FIG. 6, depicted is a block diagram of a training process 600 in the system 500 for determining scores from biomedical images. The process 600 may correspond to or include at least a subset of operations performed by the image processing system 505 under the training mode. Under the process 600, the model trainer 525 executing on the image processing system 505 may initialize, train, or otherwise establish the risk assessment model 535 using the training dataset 545. In initializing, the model trainer 525 may assign values (e.g., random values) to the weights and parameters of the risk assessment model 535. To train the risk assessment model 535, the model trainer 525 may access the database 540 to fetch, retrieve, or identify the training dataset 545. The training dataset 545 may be stored and maintained on the database 540 using at least one data structure (e.g., an array, a matrix, a heap, a list, a tree, or a data object). With the identification, the model trainer 525 may train the risk assessment model 535 using the training dataset 540. The training of the risk assessment model 535 may be in accordance with weakly supervised learning.

The training dataset 545 may include one or more examples. Each example in the training dataset 545 may identify or include at least one image 605 and at least one label 610. The label 610 may identify or include assessed risk score 625 and an annotation 630. Each example may be associated with at least one sample 615. The sample 615 may be a tissue section taken or obtained from a subject (e.g., a human, animal, or flora). For example, the tissue section for the sample 615 may include a muscle tissue, a connective tissue, an epithelial tissue, nervous tissue, or an organ tissue, in the case of a human or animal subject. The sample 615 may have or include one or more objects with one or more conditions. For instance, the tissue section for the sample 615 may contain various cell subtypes corresponding to different conditions, such as carcinoma, benign epithelial, background, stroma, necrotic, and adipose, among others.

In the training dataset 545, the image 605 may be acquired, derived, or otherwise may be of the sample 615. The image 605 itself may be acquired in accordance with microscopy techniques or a histopathological image preparer, such as using an optical microscope, a confocal microscope, a fluorescence microscope, a phosphorescence microscope, an electron microscope, among others. The image 605 may be, for example, a histological section with a hematoxylin and eosin (H&E) stain, immunostaining, hemosiderin stain, a Sudan stain, a Schiff stain, a Congo red stain, a Gram stain, a Ziehl-Neelsen stain, a Auraminerhodamine stain, a trichrome stain, a Silver stain, and Wright's Stain, among others.

The image 605 may include one or more regions of interest (ROIs). Each ROI may correspond to areas, sections, or boundaries within the sample image 605 that contain, encompass, or include conditions (e.g., features or objects within the image). For example, the sample image 605 may be a whole slide image (WSI) for digital pathology of a tissue section in the sample 615 on a glass slide, and the ROIs may correspond to areas with cancerous or lesion cells. In some embodiments, the ROIs of the sample image 605 may correspond to different conditions. Each condition may define or specify a category for the ROI. For example, when the image 605 is a WSI of the sample tissue, the conditions may correspond to various histopathological characteristics, such as carcinoma tissue, benign epithelial tissue, stroma tissue, necrotic tissue, and adipose tissue, among others.

For the sample 615 from which the associated image 605 is derived in each example, the assessed risk score 625 of the label 610 may define, specify, or otherwise identify at least one risk score. The risk score 625 may define, identify, or otherwise indicate a time to at least one event for the subject from which the sample 615 of the image 605 is obtained. The assessed risk score 625 may be manually generated or inputted by a clinician (e.g., a pathologist) examining the image 605 or the associated sample 615. For instance, the assessed risk score 625 may be the actual time to the event for the subject as measured by a clinician or the expected time to the event for the subject as predicted by the clinician. To facilitate weakly-supervised learning for training the risk assessment model 535, the assessed risk score 625 may lack any indication of specific location or portion within the image 605. Instead, the assessed risk score 625 may be descriptive of the image 605 and the sample 615 or subject from which the sample 615 is obtained.

The event for the assessed risk score 625 may be associated with or may be a result of the features within the sample 615. The event may include, for example: metastasis of cancerous cells corresponding to the features in the sample 615; malignant transformation of benign cancerous cells corresponding to the features in the sample 615; survival, hospitalization, or death of the subject from which the sample 615 is obtained; and optimal point of treatment of the condition in the sample 615, among others. The time to the event may define, specify, or otherwise identify an amount of time from the acquisition of the sample 615 from the subject to the event. The time may be measured, specified, or defined in terms of seconds, minutes, hours, days, months, or years, or any combination thereof. For example, the time in the assessed risk score 625 may be formatted as P[YYYY]-[MM]-[DD]T[hh]:[mm]:[ss] in accordance with ISO 8601.

In some embodiments, the assessed risk score 625 may indicate a probability of the occurrence of the event by time. The probability may identify a likelihood of the occurrence of the event resulting from the features in the sample 615 at a given time. The given time may be at an interval or spacing as defined by a sample 615, ranging between hours, days, months, or years, or any combination thereof. For example, the assessed risk score 625 may identify a probability of occurrence of the event (e.g., survival of the subject) at a first time, another probability of occurrence of the event at a second time, and so forth. In some embodiments, the label 610 may include a set of assessed risk score 625 for a corresponding set of different events in the associated sample. The types of events may also be included or identified in the label 610. Each risk score 625 may indicate the time to the occurrence of the respective event. For example, one risk score 625 may indicate the time to occurrence of the hospitalization and another risk score 625 may indicate the time to death for the subject given the features in the sample 615.

In addition, for the associated image 605 in each example, the annotation 630 of the label 610 may identify the one or more ROIs in the image 605. The annotation 630 may include a set of pixels defining a location of each ROI within the image 605 corresponding to a respective feature in the sample 615. In some embodiments, the annotation 630 may include the set of pixels corresponding to the pixels of the ROI in the image 605. In some embodiments, the annotation 630 may correspond to an enclosure, boundary, or a contour at least partially enclosing the ROI within the image 605. The annotation 630 may be manually generated or inputted by a pathologist examining the image 605. For instance, a clinician may use a graphical user interface (GUI) of an application running on a computing device to highlight portions of the image 605 corresponding to the ROIs to define and generate the annotation 630 for the image 605. The annotation 630 may be used to constrain or narrow the portions of the image 605 in each example used to train the risk assessment model 535, thereby reducing the amount of data to be processed during training. As the risk assessment model 535 is to be trained using weakly supervised methods, the annotation 630 may not be factored in while updating the parameters of the risk assessment model 535.

In training the risk assessment model 535, the model applier 530 executing on the image processing system 505 may identify or generate the set of tiles 620A-N (hereinafter generally referred to as tiles 620) from the image 605 from each example of the training dataset 545. Each tile 620 may correspond to a portion of the image 605 in the example. In some embodiments, the set of tiles 620 may be defined in the example of the training dataset 545. The model applier 530 may identify the set of tiles 620 from the image 605 in accordance with the definition in the example. In some embodiments, the model applier 530 may partition or divide the image 605 into the set of tiles 620. The set of tiles 620 may be disjoined or may be overlap with one another. In some embodiments, the model applier 530 may generate the set of tiles 620 from the image 605 with an overlap in accordance with a set ratio. The ratio may range from 10% to 90% overlap between pairs of adjacent tiles 620.

In some embodiments, the model applier 530 may identify the portions of the image 605 in each example 605 from which to generate the tiles 620, using the annotation 630 for the associated image 605. For the image 605, the model applier 530 may find or identify the annotation 630 from the training dataset 545. The model applier 530 may identify portions of the image 605 corresponding to the ROIs as defined by the annotation 630. The portions may be defined in terms of pixels for the ROIs or contours at least partially around each ROI as identified by the annotation 630 of the training dataset 545. With the identification, the model applier 530 may generate the set of tiles 620 from the portions corresponding to the ROIs.

In some embodiments, the model applier 530 may identify or detect one or more areas within the image 605 from each example of the training dataset 545. In some embodiments, the areas may correspond to a positive space within the image 605. The identification of the positive space may be based on a visual characteristic of the pixels in the image 605. For example, the positive space may correspond to areas of the image 605 that is neither white nor null as indicated by the red, green, blue (RGB) values of the pixels in the areas. With the identification, the model applier 530 may generate the set of tiles 620 using the areas corresponding to positive space within the image 605. Conversely, in some embodiments, the areas may correspond to a negative space within the image 605. The identification of the negative space may be based on a visual characteristic of the pixels in the image 605. For example, the positive space may correspond to areas of the image 605 that is white nor null as indicated by the RGB values of the pixels in the areas. The model applier 530 may remove the areas corresponding to the negative space from the image 605. Using the remaining portion of the image 605, the model applier 530 may generate the set of tiles 620.

In some embodiments, the model applier 530 may retrieve, identify, or otherwise receive a selection of a subset of tiles 620 via a user interface. The selected tiles 620 may correspond to one or more ROIs in the image 605, and by extension may correspond to the features in the sample 615. The user interface may be displayed, presented, or otherwise provided to a user (e.g., the clinician or pathology) via an application running on a computing device (e.g., a client communicatively coupled with the image processing system 505). Through the user interface, the user may select or identify portions of the image 605 or the subset of tiles 620 corresponding to the ROIs. The application may send, relay, or provide the selection to the model applier 530. The model applier 530 in turn may identify or receive the selection of the subset of tiles 620 from the image 605.

With the identification, the model applier 530 may apply the set of tiles 620 from the image 605 of each example in the training dataset 545 to the risk assessment model 535. In some embodiments, the model applier 530 may apply the selected subset of tiles 620 from the image 605 into the risk assessment model 535. The risk assessment model 535 may include or have a set of weights (sometimes herein referred to as parameters, kernels, or filters) and a set of centroids to process inputs and produce outputs. The set of weights may be arranged or defined in the risk assessment model 535, for example, in accordance with a convolutional neural network (CNN) architecture in the tile encoder 550 and the aggregator 560. The set of centroids may be arranged or defined in the risk assessment model 535, for example, in a feature space defined by the clusterer 555. When initialized, both the weights and the centroids may be assigned to set values (e.g., random values). Details of the architecture and functionality of the tile encoder 550, the clusterer 555, and the aggregator 560 are described herein below in conjunction with FIGS. 7A-10.

In applying, the model applier 530 may provide or feed the tiles 620 of the image 605 from each example of the training dataset 545 as the input to the risk assessment model 535. Upon feeding, the model applier 530 may process the input tiles 620 in accordance with the set of weights and centroids of the risk assessment model 535 to generate at least one output. The output may identify or include at least one estimated risk score 635. Each risk score 635 may be for or associated with the image 605 from which the set of input tiles 620 are derived and processed through the risk assessment model 535. Each risk score 635 may indicate a time to at least one event for the subject from which the sample 615 of the image 605 is obtained, as a result of the features in the sample 615. The event may be of the same type as identified in the assessed risk score 625, such as: metastasis of cancerous cells; malignant transformation of benign cancerous cells; survival, hospitalization, or death of the subject; and optimal point of treatment, among others. The time to the event may identify the predicted or expected amount of time. In some embodiments, the risk score 635 may indicate a probability of the occurrence of the event by time at a sample rate, ranging between hours, days, months, or years, or any combination thereof. In some embodiments, the output from the risk assessment model 535 may include a set of risk scores 635 for a corresponding set of different events. Each risk score 635 may indicate the time to the occurrence of the respective type of event.

Figure 7A:
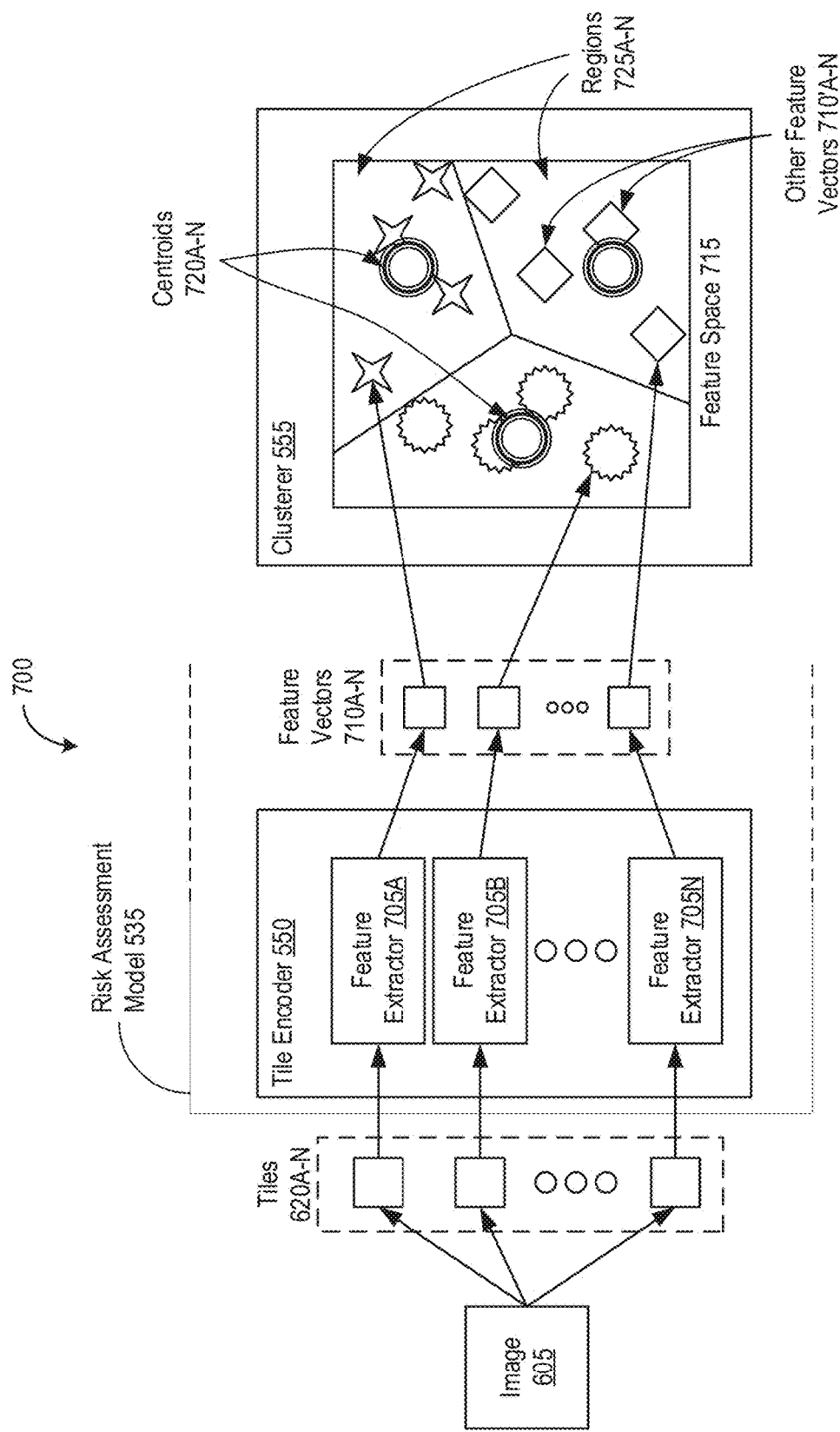
FIGS. 7A and 7B are block diagrams of an architecture for a risk model in the system for determining scores in accordance with an illustrative embodiment.
Figure 7B:
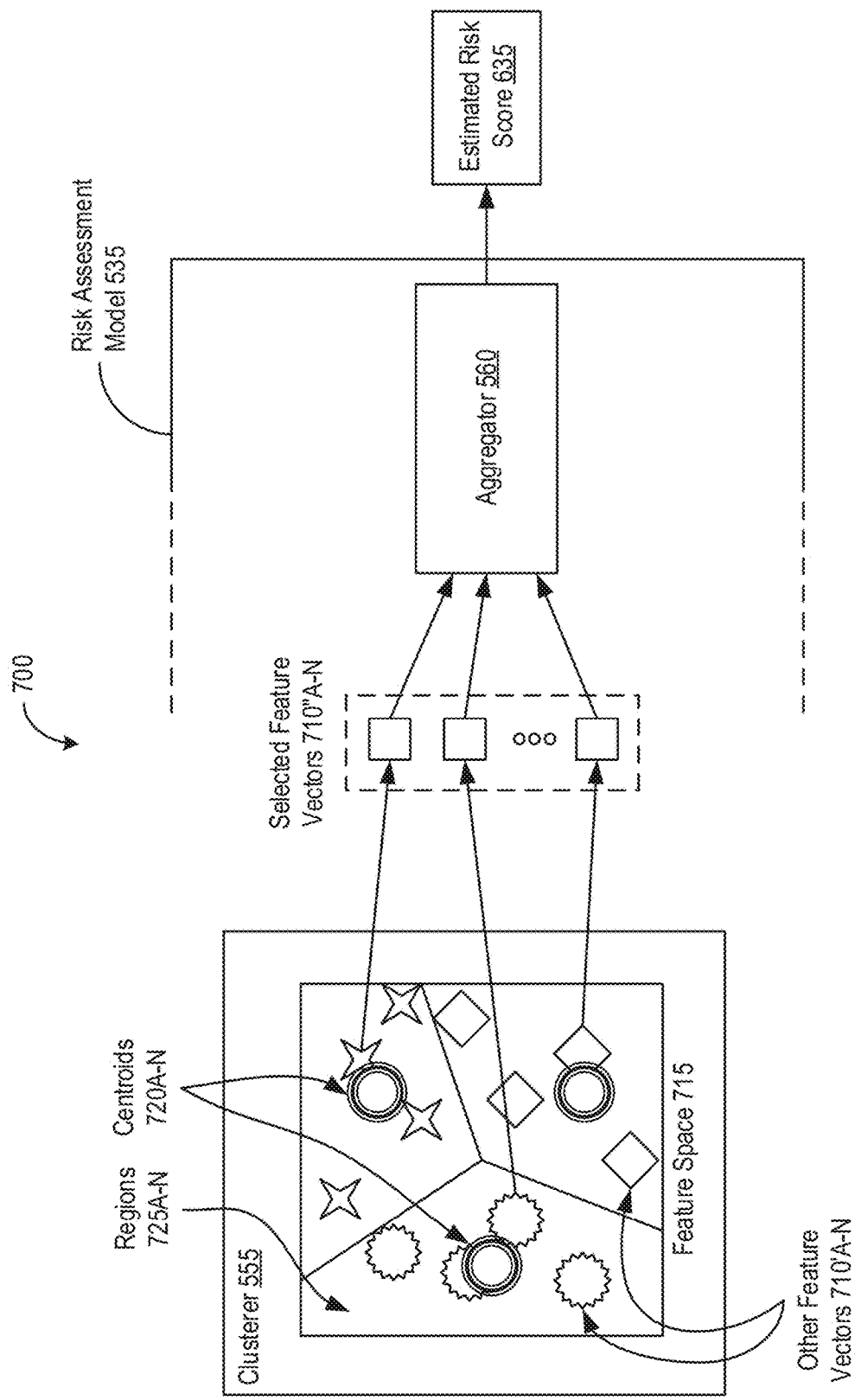

Referring now to FIGS. 7A and 7B, depicted are block diagrams of an architecture 800 for the risk assessment model 535 in the system 500 for determining scores from biomedical images. Starting from FIG. 7A, under the architecture 700 for the risk assessment model 535, the tile encoder 550 may include a bank or a set of feature extractors 705A-N (hereinafter generally referred to as feature extractors 705). At least some of the set of weights of the risk assessment model 535 may configured, arrayed, or otherwise arranged across the tile encoder 550, including the set of feature extractors 705 therein. The inputs to the risk assessment model 535 may be provided or fed by the model applier 530 as the inputs to the tile encoder 550. The inputs may include the set of tiles 620 from the images 605 from one or more examples in the training dataset 545. Each input may be provided or fed as the input to a corresponding feature extractor 705.

The number of feature extractors 705 included in the tile encoder 550 may be dependent on the number of tiles 620. In some embodiments, the number of feature extractors 705 in the tile encoder 550 may correspond to the total number of tiles 620 inputted into the tile encoder 550 from one image 605. For example, for each tile 620 from one image 605 inputted into the risk assessment model 535, the tile encoder 550 may have a corresponding feature extractor 705 to process the input tile 620. In some embodiments, the number of feature extractors 705 in the tile encoder 550 may correspond to the set of tiles 620 from multiple images 605 from multiple examples of the training dataset 545. In some embodiments, the number of feature extractors 705 may correspond to the number of tiles 620 inputted at a given instance. In some embodiments, the number of feature extractors 705 may correspond to the number of tiles 620 inputted at an epoch of training.

In the tile encoder 550, each feature extractor 705 may receive, retrieve, or otherwise identify the input tile 620 from the image 605. Upon receipt, the feature extractor 705 may process the tile 620 in accordance with the set of weights. The set of weights in the feature extractor 705 may be arranged, for example, according to a convolutional neural network (CNN). In some embodiments, the set of weights may be shared amongst the feature extractor 705. For example, the values and interconnections of the weights within the feature extractor 705 may be the same throughout the feature extractors 705 in the risk assessment model 535. In some embodiments, the set of weights may be not shared among the feature extractors 705. For instance, the values or the interconnections of the weights in one feature extractor 705 may differ or may be independent of the values or the interconnections of the weights in other feature extractors 705. The feature extractor 705 may be implemented using the architectures detailed herein in conjunction with FIGS. 8A and 8B.

From processing the tile 620 using the weights, the feature extractor 705 may produce or generate at least one feature vector 710A-N (hereinafter generally referred to as feature vector 710). The feature vector 710 may be a lower dimensional representation of the input tile 620. For example, the feature vector 710 may be an embedding, encoding, or a representation of latent features in the input tile 620. The feature vector 710 may be n dimensional and may include n values along each dimension. The values in each dimension may likewise be a representation of latent features from the tile 620. The set of feature vectors 710 outputted by the set of feature extractors 705 in the tile encoder 550 may be provided or fed forward as inputs to the clusterer 555.

The clusterer 555 may retrieve, receive, or otherwise identify the set of feature vectors 710 outputted by the set of feature extractors 705 of the tile encoder 550 as input to define or map against at least one feature space 715. The clusterer 555 may include or define the feature space 715. The feature space 715 may be an n-dimensional space in which each feature space 715 can be defined. The feature space 715 may define or otherwise include a set of centroids 720A-N (hereinafter generally referred to as centroids 720). Each centroid 720 may correspond to a data point in the n-dimensional feature space 715. Upon initialization during the training process, the set of centroids 720 in the clusterer 555 may be assigned a set value (e.g., a random value). The set of centroids 720 may be used to delineate, demarcate, or otherwise define a corresponding set of regions 725A-N (hereinafter generally referred to as regions 725) within the feature space 715. Each region 725 may correspond to a portion of the feature space 715. In some embodiments, each region 725 may correspond to the portion of the feature space 715 based on a distance about the associated centroid 720 in the feature space 715. The distance may be, for example, proximity in terms of Euclidean distance or L-norm distance, among others, to the centroid 720 defining the respective region 725. Each region 725 and corresponding centroid 720 may correspond to a one or more of the latent parameters correlated with the features of the sample 615 as depicted in the image 605 that can be used to determine the risk score 635 for the image 605.

Upon receipt, the clusterer 555 may assign or map each feature vector 710 to the feature space 715. To assign, the clusterer 555 may identify values along each dimension of the feature vector 710. Based on the values along the dimensions, the clusterer 555 may identify a point within the feature space 715 to map the feature vector 710 against. For example, the feature vectors 710 produced by the tile encoder 550 may be n-dimensional and each feature vector 710 may be mapped as a data point using the values along each of the n dimensions within the feature space 715. When assigning feature vectors 710 generated from the tiles 620 of one image 605, the clusterer 555 may have already assigned or mapped other feature vectors 710'A-N (hereinafter generally referred to as other feature vectors 710') from the tile 620 of other images 605 in the training dataset 545.

With the mapping of each feature vector 710 within the feature space 715, the clusterer 555 may also determine or identify the region 725 to which to assign the feature vector 710. For each feature vector 710, the clusterer 555 may calculate or determine a distance between the point corresponding to the feature vector 710 and each centroid 720 within the feature space 715. The distance may be determined in accordance with Euclidean distance or L-norm distance, among others. Based on the distances to the centroids 720 within the feature space 715, the clusterer 555 may assign the feature vector 710 to one of the regions 725. For example, the clusterer 555 may assign the feature vector 710 to the region 725 associated with the most proximate centroid 720 within the feature space 715. In some embodiments, the clusterer 555 may identify the region 725 to which to assign the feature vector 710 based on the values along the dimensions of the feature vector 710. As discussed above, the clusterer 555 may have already partitioned the feature space 715 into the set of regions 725 based on the associated set of centroids 720. The clusterer 555 may compare the values along the dimensions of the feature vector 710 with the values of the feature space 715 associated with the set of regions 725. Based on the comparison, the clusterer 555 may assign the feature vector 710 to the region 725 in which the values along the dimensions reside. The other feature vectors 710' may have been assigned to the regions 725 of the feature space 715 in a similar manner.

Moving onto FIG. 7B, the clusterer 555 may identify or select a subset of feature vectors 710"A-N (hereinafter generally referred to as subset of feature vectors 710") based on the centroids 720 or regions 725 in the feature space 715. The selected subset of feature vectors 710" may be associated with one image 605 of one example in the training dataset 745. By extension, the selected subset of features 710" may correspond to a subset of tiles 620 from the image 605. The selected subset of feature vector 710" may include at least one feature vectors 710 from each of the regions 725 in the feature space 715.

To identify, the clusterer 555 may identify the superset of feature vectors 710 within the feature space 715 generated from the tiles 620 for each image 605. From the superset of feature vectors 710 associated with the image 605, the clusterer 555 may select or identify the feature vectors 710 in each region 725 of the feature space 715. From the feature vectors 710 in each region 725, the clusterer 555 may select or identify one feature vector 710" for the subset based on a distance of the feature vector 710" to the centroid 720 used to define the respective region 725. The distance may be in terms of Euclidean distance or L-norm distance, among others. The feature vector 710" selected may correspond to the feature vector 710 closest to the centroid 720 in the associated region 725. The feature vector 710" closest to the centroid 720 may be identified as the most representative for the latent feature correlated with the centroid 720. In some embodiments, the clusterer 555 may identify the subset of tiles 620 that correspond to the subset of feature vectors 710" selected from the superset of feature vector 710. The selected subset of feature vectors 710" may be provided or fed forward by the model applier 530 as an input to the aggregator 560. In some embodiments, the selected subset of tiles 620 may be provided as an output of the overall risk assessment model 535.

The aggregator 560 may retrieve, receive, or otherwise identify the subset of feature vectors 710" selected by the clusterer 555. In some embodiments, the aggregator 560 may concatenate, conjoin, or otherwise combine the subset of feature vectors 710" upon identification. The aggregator 560 may process the input subset of feature vectors 710" in accordance with the set of weights defined at the aggregator 560. The set of weights in the aggregator 560 may be arranged, for example, according to a convolutional neural network (CNN). The feature aggregator 560 may be implemented using the architectures detailed herein in conjunction with FIGS. 8A and 8B. In some embodiments, the aggregator 560 may process the combined subset of feature vectors 710" (e.g., a concatenation of feature vectors 710") using the set of weights.

From processing the feature vectors 710", the aggregator 560 may produce or generate at least output. The output may include the output of the overall risk assessment model 535, as discussed above. In particular, the aggregator 560 may generate or determine the estimated risk score 630 for the image 605, from which the input set of tiles 620 are obtained, using the selected feature vectors 710". As discussed above, the risk score 635 may indicate a time to at least one event for the subject from which the sample 615 of the image 605 is obtained, as a result of the features in the sample 615. The time to the event may identify the predicted or expected amount of time. In some embodiments, the risk score 635 may indicate a probability of the occurrence of the event by time at a sample rate, ranging between hours, days, months, or years, or any combination thereof. In some embodiments, the output from the risk assessment model 535 may include a set of risk scores for a corresponding set of different events. Each risk score may indicate the time to the occurrence of the respective event.

Figure 8A:
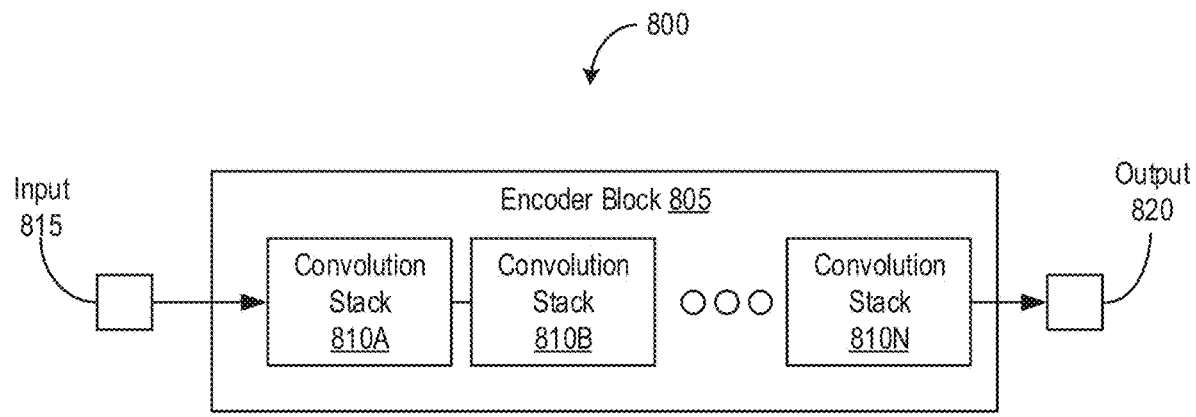
FIG. 8A is a block diagram of an architecture of an encoder block used to implement the risk model in the system for determining scores in accordance with an illustrative embodiment.

Referring now to FIG. 8A, depicted is a block diagram of an architecture 800 of an encoder block 805 used to implement the risk assessment model 535 in the system for determining scores from biomedical images. The encoder block 805 may be used to implement the individual feature extractors 705 as well as the aggregator 560 in the risk assessment model 535. For example, each feature extractor 705 and the aggregator 560 may be an instance of the encoder block 805. Under the architecture 800, the encoder block 805 may include one or more convolution stacks 810A-N (hereinafter generally referred to as convolution stacks 810). The encoder block 805 may also include at least one input 815 and at least one output 820. The input 815 and the output 820 may be related via the set of weights defined in the convolution stacks 810. When used to implement the feature extractor 705, the input 815 of the encoder block 805 may correspond to or include the tile 620 from the image 605 and the output 820 may correspond or include the feature vector 710. When used to implement the aggregator 560, the input 815 of the encoder block 805 may correspond to or include the subset of feature vectors 710" and the output may include the set of estimated risk score 635 and other outputs described above. Each convolution stack 810 may define or include the weights the encoder block 805. The set of convolution stacks 810 can be arranged in series (e.g., as depicted) or parallel configuration, or in any combination. In a series configuration, the input of one convolution stacks 810 may include the output of the previous convolution stacks 810 (e.g., as depicted). In parallel configuration, the input of one convolution stacks 810 may include the input of the entire encoder block 805. Details regarding the architecture of the convolution stack 810 are provided herein below in conjunction with FIG. 8B.

Figure 8B:
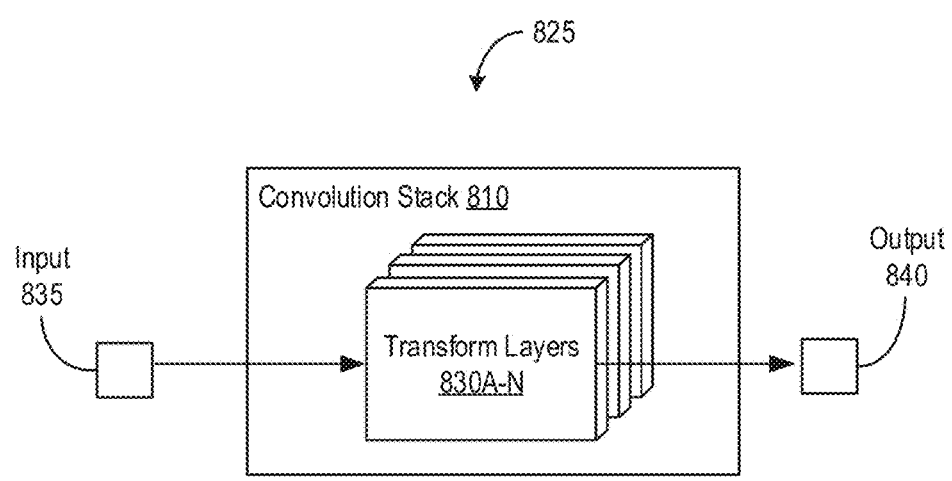
FIG. 8B is a block diagram of an architecture of a convolution stack used to implement the risk model in the system for determining scores in accordance with an illustrative embodiment.

Referring now to FIG. 8B, depicted is a block diagram of an architecture 825 of the convolution stack 810 of the encoder block 805 used to implement the risk assessment model 535 in the system 500 for determining scores from biomedical images. Under the architecture 825, the convolution stack 810 may include one or more transform layers 830A-N (hereinafter generally referred to as transform layers 830). The convolution stack 810 also include at least one input 835 and at least one output feature map 840. The input 835 and the output 840 may be related via the set of weights defined in the transform layers 830 of the convolution stack 810. The set of transform layers 830 can be arranged in series, with an output of one transform layer 830 fed as an input to a succeeding transform layer 830. Each transform layer 830 may have a non-linear input-to-output characteristic. The transform layer 830 may comprise a convolutional layer, a normalization layer, and an activation layer (e.g., a rectified linear unit (ReLU), softmax function, or a sigmoid function), among others. In some embodiments, the set of transform layers 830 may be a convolutional neural network (CNN). For example, the convolutional layer, the normalization layer, and the activation layer may be arranged in accordance with CNN. The activation layer may be a softmax function for binary classifications and may be a sigmoid function for non-binary classifications.

Figure 9:
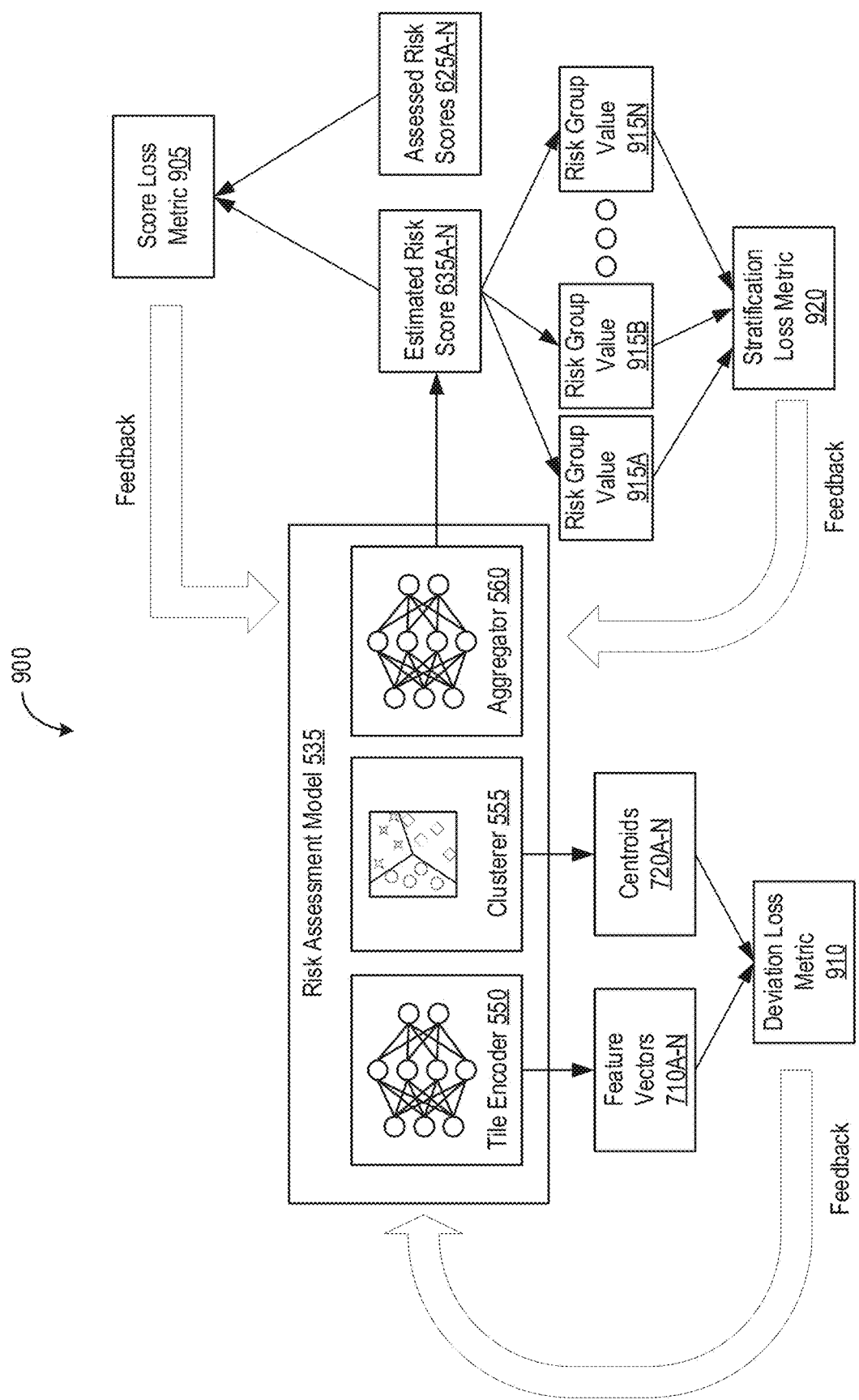
FIG. 9 depicts a block diagram of a process for updating in the system for determining scores, in accordance with an illustrative embodiment.

Referring now to FIG. 9, depicted is a block diagram of an updating process 900 in the system 500 for determining scores from biomedical images. The process 900 may correspond to or include at least a subset of operations performed by the image processing system 505 under the training mode. Under the process 900, the model trainer 525 may retrieve, obtain, or otherwise identify the output generated by the risk assessment model 535 from the application of the image 605. The output may include, for example, estimated risk scores 635A-N (referring to multiple instances of the risk score 625 and hereinafter generally referred to risk scores 635). The estimated risk scores 635 may correspond to the images 605 from which sets of tiles 620 were inputted into the risk assessment model 535. Each risk score 625 may be for or associated with the corresponding image 605 from which the input of set of tiles 620 is identified and used to determine the risk score 625. Each risk score 625 may be for or associated with the corresponding sample 615 from which the image 605 is obtained. As discussed above, the risk score 625 may indicative the time to the designated event for the subject resulting from the features in the sample 615. In some embodiments, a set of risk scores 625 indicating time to corresponding events may be for the associated image 605 or sample 615. The model trainer 525 may also identify the example of the training dataset 545 that includes the image 605 from which the tiles 620 were inputted into the risk assessment model 535. The model trainer 525 may retrieve or identify the assessed risk scores 625 from the same example in the training dataset 545.

With the identification, the model trainer 525 may compare the estimated risk score 635 generated by the risk assessment model 535 and the assessed risk scores 625 in the example of the training dataset 545. Based on the comparison, the model trainer 525 may determine whether the assessed risk scores 625 correspond to or match the estimated risk score 635. In some embodiments, the model trainer 525 may determine a number of the estimated risk score 635 that match or do not match the assessed risk scores 625. The model trainer 525 may traverse through the set of estimated risk score 635 in performing the comparisons. If the estimated category 625 differs from all of the assessed risk scores 625 in the example, the model trainer 525 may determine that the estimated category 625 does not match any of the assessed risk scores 625. Furthermore, the model trainer 525 may also increment the number of non-matching estimated risk score 635. Conversely, if the estimated category 625 is the same as at least one of the assessed risk scores 625, the model trainer 525 may determine that the estimated category 625 matches the corresponding assessed risk score 625. In addition, the model trainer 525 may also increment the number of matching estimated risk score match. The comparison may be repeated over all of the estimated risk score 635.

Based on comparison between the estimated risk score 635 and the assessed risk scores 625 for the associated image 605, the model trainer 525 may calculate, generate, or otherwise determine at least one score loss metric 905. The score loss metric 905 may indicate a degree of deviation of the estimated risk score 635 outputted by the risk assessment model 535 from the expected assessed risk scores 625 as identified in the example of the training dataset 545. In some embodiments, the model trainer 525 may determine the score loss metric 905 based on the number of matching estimated risk score 635 or the number of non-matching estimated risk score 635, or both. The score loss metric 905 may be calculated in accordance with any number of loss functions, such as a norm loss (e.g., L1 or L2), mean squared error (MSE), a quadratic loss, a cross-entropy loss, and a Huber loss, among others. In general, the higher the score loss metric 905, the more the output may have deviated from the expected result of the input. Conversely, the lower the score loss metric 905, the lower the output may have deviated from the expected result.

In addition, the model trainer 525 may calculate, generate, or otherwise determine at least one deviation loss metric 910 based on comparison between the set of feature vectors 710 and the centroids 720 within the feature space 715. The deviation loss metric 910 may indicate a degree of dispersion, spread, or distance between the centroid 720 and each of the feature vectors 710 assigned to the region 725. The determination of the deviation loss metric 910 may be based on a comparison between each centroid 720 and each of the feature vectors 710 assigned to the region 725 within the feature space 715. In comparing, the model trainer 525 may calculate or determine a distance between the centroid 720 and each feature vector 710 in the region 725 associated with the centroid 720. The distance may be in accordance with Euclidean distance or L-norm distance, among others. Using the distances over all the centroids 720, the model trainer 525 may determine the deviation loss metric 910. The deviation loss metric 910 may be calculated in accordance with any number of loss functions, such as a norm loss (e.g., L1 or L2), mean squared error (MSE), a quadratic loss, a cross-entropy loss, and a Huber loss, among others. In general, the higher the deviation loss metric 910, the more the spread or distance between each centroid 720 and assigned feature vectors 710. Conversely, the lower the deviation loss metric 910, the lower the spread or distance between each centroid 720 and the assigned feature vectors 710.

Furthermore, the model trainer 525 may calculate, generate, or determine one or more risk group values 915A-N (hereinafter generally related to risk group values 915) based on the set of estimated risk scores 635. Each risk group value 915 may be derived, calculated, or otherwise determined from at least a corresponding subset of estimated risk scores 635. To determine, the model trainer 525 may partition, classify, or otherwise assign the set of risk scores 635 into one or more groups in accordance with values for the estimated risk scores 635. Each group may represent a group of subjects, from which the samples 615 for the images 605 are obtained, at a corresponding risk level. Each group may correspond to or may specify or define a range of values or percentiles for estimated risk scores 635 to be assigned to the group. For example, the model trainer 525 may separate the set of risk scores 635 into two groups: a high risk group with values in the upper half and a low risk group with values in the lower half. For each group, the model trainer 525 may determine the risk group value 915 as a function of the assigned, estimated risk scores 635. The function may include a mean, a median, a weighted average, variance, a minimum, a maximum, or other measures of the estimated risk scores 635 assigned to the group.

Based on the risk group values 915, the model trainer 525 may calculate, generate, or otherwise determine at least one stratification loss metric 920. The stratification loss metric 920 may indicate or identify a dispersion or distribution of values among the groups of the estimated risk values 635. The stratification loss metric 920 may be used to update the parameters of the risk assessment model 535 such that the output values for the estimated risk values 635 are further varied or spread apart among different groups. The stratification loss metric 920 may be calculated in accordance with any number of loss functions, such as a Huber loss, norm loss (e.g., L1 or L2), mean squared error (MSE), a quadratic loss, and a cross-entropy loss, among others. In general, the higher the stratification loss metric 920, the tighter the distribution of the values of the estimated risk scores 635 among the groups may be. Conversely, the lower the stratification loss metric 920, the greater the distribution of the values of the estimated risk scores 635 among the groups may be.

Using a combination of the score loss metric 905, the deviation loss metric 910, and the stratification loss metric 920, the model trainer 525 modify, set, or otherwise update the set of weights across the risk assessment model 535, such as the weights in the tile encoder 550 and the aggregator 560. The combination may be a function (e.g., a sum or weighted average) of one or more of the score loss metric 905, the deviation loss metric 910, and the stratification loss metric 920, among others. The weights of the tile encoder 550 and the aggregator 560 may be updated using the score loss metric 905 in the same feedback, for example, in an end-to-end manner as described in Section A. In some embodiments, the model trainer 525 may use the score loss metric 905 and the stratification loss metric 920 to update the set of centroids 720 in the clusterer 555. The updating of weights may be in accordance with an optimization function (or an objective function) for the tile encoder 550 and the aggregator 560 in the risk assessment model 535. The optimization function may define one or more rates or parameters at which the weights of the risk assessment model 535 are to be updated. The updating of the parameters in the risk assessment model 535 may be repeated until convergence.

With the updating of the weights in the tile encoder 550 or the aggregator 560 or the centroids 720 in the clusterer 555, the model trainer 525 may invoke the model applier 530 to reapply the tiles 620 of the image 605 from each example of the training dataset 545. The model applier 530 may repeat the process of the applying the risk assessment model 535 as described herein above to commence another training epoch. In applying, the model applier 530 may provide or feed the tiles 620 of the image 605 into the tile encoder 550 of the risk assessment model 535. The model applier 530 may process the tiles 620 in accordance with the updated weights of the feature extractors 705 of the tile encoder 550 to generate a new set of feature vectors 710. The new feature vectors 710 may contain new values different from the previous feature vectors 710, as updated weights in the feature extractors 705 are used to generate the new feature vectors 710. Upon generation, the model applier 530 may invoke the clusterer 555 to map the newly generated set of feature vectors 710 to the feature space 715. Because the feature vectors 710 contain new values, the new set of feature vectors 710 may be mapped to different points within the feature space 715 relative to the prior set of feature vectors 710.

Based on the assignment of new feature vectors 710 in the feature space 715, the model trainer 525 may change, set, or otherwise update the set of centroids 720 of the clusterer 555 within the feature space 715. To update, the model trainer 525 may identify the feature vectors 710 previously assigned to each region 725 from the previous application of the tiles 620. For each region 725, the model trainer 525 may identify the values of each feature vector 710 within the feature space 715. Using the values, the model trainer 525 may determine the new values for each centroid 720 in the feature space 715. In some embodiments, the model trainer 525 may determine the centroid 720 based on a combination (e.g., mean) of the values of the feature vectors 710 assigned to the region 725. Once determined, the model trainer 525 may update the each centroid 720 to the respective new values within the feature space 715. With the re-assignment of the centroids 720, the training and application process may be repeated as described above upon convergence.

Upon convergence, the model trainer 525 may store and maintain the set of weights in the tile encoder 550 and the aggregator 560 and the set of centroids 720 of the clusterer 555. The convergence may correspond to a change in the values of weights in the tile encoder 550 and the aggregator 560 of less than a threshold value. The convergence may also correspond to a change in the values of the centroids 720 of less than some threshold value. The set of weights in the tile encoder 550 and the aggregator 560 and the set of centroids 720 may be stored and maintained using one or more data structures, such as an array, a matrix, a heap, a list, a tree, or a data object, among others. In some embodiments, the model trainer 525 may store and maintain the weights and the centroids 720 on the database 540. In some embodiments, the model trainer 525 may also store and maintain the identifiers for the types of events for the assessed risk scores 625 as identified in the label 610.

Figure 10:
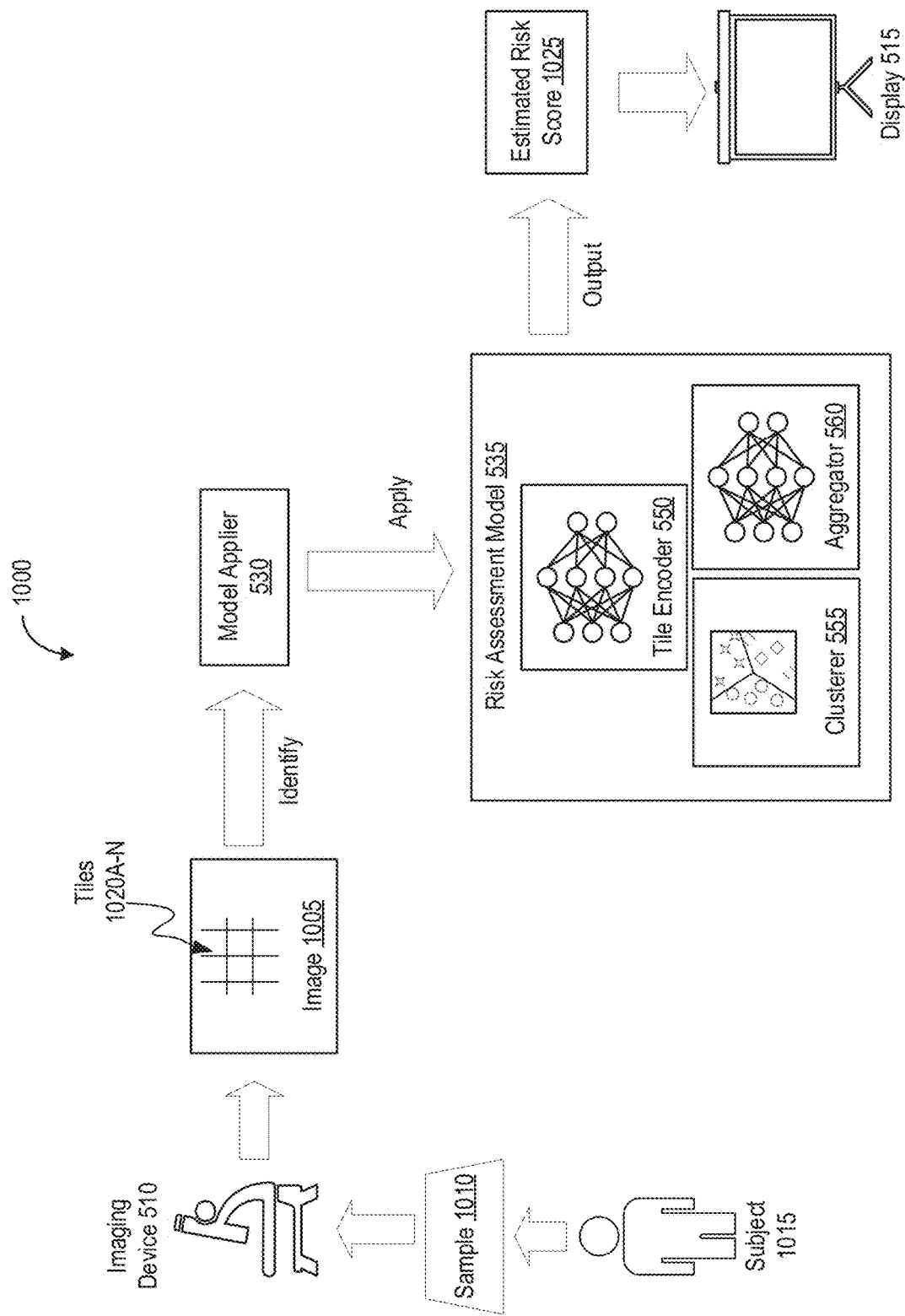
FIG. 10 depicts a block diagram of a process for inference in the system for determining scores, in accordance with an illustrative embodiment.

FIG. 10 is a block diagram of an inference process 1000 in the system 500 for determining scores from biomedical images. The process 1000 may correspond to or include operations performed by the image processing system 505 under evaluation mode. The operations performed under evaluation mode may overlap or may be similar to the operations performed under training mode as discussed above. Under the process 1000, the imaging device 510 may scan, obtain, or otherwise acquire at least one image 1005 of at least one sample 1010 from a subject 1015. The image 1005 may be similar to the image 605 described above, but may be newly acquired from the imaging device 510. For instance, the image 1005 may be a histological section corresponding the sample 1010 with a hematoxylin and eosin (H&E) stain on a slide acquired via an optical microscope. The sample 1010 may be a tissue section with various cell subtypes corresponding to different conditions, such as carcinoma, benign epithelial, background, stroma, necrotic, and adipose, among others. Upon acquisition, the imaging device 510 may send, transmit, or otherwise provide the acquired image 1005 to the imaging processing system 505.

The model applier 530 may in turn retrieve, receive, or otherwise identify the image 1005 from the imaging device 510. The model applier 530 may process the image 1005 in a similar manner as detailed above with respect to the image 1005. Upon receipt, the model applier 530 may generate the set of tiles 1020A-N (hereinafter generally referred to as tiles 1020) from the image 1005. The tiles 1020 may be generated from areas within the image 1005 determined to correspond to positive space.

In some embodiments, the model applier 530 may retrieve, identify, or otherwise receive a selection of tiles 1020 in the image 1005 via a user interface. The selected tiles 1020 may correspond to one or more ROIs in the image 1005, and by extension may correspond to the features in the sample 1010. The user interface may be displayed, presented, or otherwise provided to a user (e.g., the clinician or pathology) via an application running on a computing device (e.g., a client communicatively coupled with the image processing system 505). Through the user interface, the user may select or identify portions of the image 1005 or the subset of tiles 1020 corresponding to the ROIs. The application may send, relay, or provide the selection to the model applier 530. The model applier 530 in turn may identify or receive the selection of the subset of tiles 1020 from the image 1005.

With the generation, the model applier 530 may apply the tiles 1020 from the image 1005 to the risk assessment model 535. In applying, the model applier 530 may provide or feed the tiles 1020 of the image 1005 as input into the risk assessment model 535. Upon feeding, the model applier 530 may process the input tiles 1020 with the set of weights of the tile encoder 550 and the aggregator 560 and centroids of the clusterer 555 in the risk assessment model 535 to generate at least one output. The processing may be similar as described above in relation to the input tiles 620, and the output may be similar as described above.

The output may identify or include at least one estimated risk score 1025. Each risk score 1025 may be for or associated with the image 1005 from which the set of input tiles 1020 are derived and processed through the risk assessment model 535. Each estimated risk score 1025 may indicate a time to at least one event for the subject 1015 from which the sample 1010 of the image 1005 is obtained, as a result of the features in the sample 1010. The event for the subject 1015 resulting from the features in the sample 1010 may include various types, such as: metastasis of cancerous cells; malignant transformation of benign cancerous cells; survival, hospitalization, or death of the subject; and optimal point of treatment, among others. The time to the event may identify the predicted or expected amount of time from the acquisition of the sample 1010 from the subject 1015 to the event. The time may be measured, specified, or defined in terms of seconds, minutes, hours, days, months, or years, or any combination thereof. In some embodiments, the risk score 1025 may indicate a probability of the occurrence of the event for the subject 1015 by time at a sample rate, ranging between hours, days, months, or years, or any combination thereof. In some embodiments, the output from the risk assessment model 535 may include a set of risk scores 1025 for a corresponding set of different events. Each risk score 1025 may indicate the time to the occurrence of the respective type of event. The types of events for which the risk scores 1025 are generated may be those for which the risk assessment model 535 was trained using the training dataset 545.

Upon generation, the model applier 530 may write, product, or otherwise generate an association between the image 1005 and the estimated risk score 1025 generated by the risk assessment model 535. The association may be generated using one or more data structures, such as an array, a matrix, a heap, a list, a tree, or a data object, among others. In some embodiments, the association may be with the tiles 1020 from the image 1005, subject 1015 (e.g., using an anonymized identifier), and type of event associated with each estimated risk score 1025. In some embodiments, the model applier 530 may identify the type of event for each estimated risk score 1025 produced by the risk assessment model 535. With the generation, the model applier 530 may store and maintain the association on the database 540.

In addition, the model applier 530 may send, transmit, or otherwise provide information based on the output from the risk assessment model 535 to the display 515 for presentation. The information may identify or include one or more of: the subject 1015 (e.g., using an anonymized identifier), the image 1005, the estimated risk score(s) 1025, and the type(s) of event(s), among others. The display 515 may be part of the image processing system 505 or may be of another computing device. In some embodiments, the model applier 530 may provide the association to the display 515. With the receipt, the display 515 may render or present the information based on the output from the risk assessment model 535. In some embodiments, the display 515 may present the image 1005 (or tiles 1020) along with each estimated risk score 1025 and an identification of the corresponding type of event. For example, the display 515 may render a graphical user interface (GUI) with the image 1005, type of event, and the estimated risk score 1025. The information displayed for the estimated risk score 1025 may identify or include the time to the event or the probability of occurrence by time for the given type of event, or both, among others.

In this manner, the risk assessment model 535 may be trained to automatically determine times to events from biomedical images for the samples depicted therein. The learning and training process may be perform from one end (e.g., the tile encoder 550) to the other end (e.g., the aggregator 560) of the risk assessment model 535 in one stroke, thereby eliminating any bottlenecks resulting from training individual components of a model separately. Additionally, the feature space defined by a clusterer 555 may be used to deduce latent morphological features embedded in the feature vectors or maps generated by the encoders for determining the times to particular events for the subject. The output may be used to predict or estimate the time to a particular event for a subject, and thus aid in diagnosing and treating the subject 1015 with conditions as indicated in the features of the tissue sample.

Figure 11A:
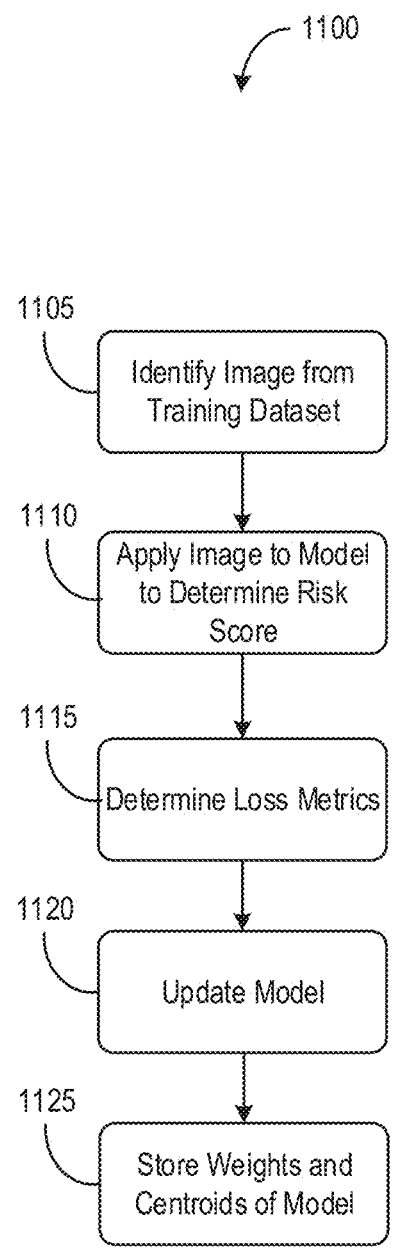
FIG. 11A depicts a flow diagram of a method of determining scores indicative of times to events from biomedical images, in accordance with an illustrative embodiment.

Referring now to FIG. 11A, depicted is a flow diagram depicting a method 1100 of training a model to determine scores from biomedical images. The method 1100 may be implemented using the system 500 described herein in conjunction with FIGS. 5-10 or the system 1200 described herein in conjunction with FIG. 12. Under method 1100, a computing system (e.g., the image processing system 505) may identify an image (e.g., the image 605) from a training dataset (e.g., the training dataset 545) (1105). The computing system may apply the image to a model (e.g., the risk assessment model 535) to determine a risk score (e.g., the estimated risk score 635) (1110). The computing system may determine a loss metric (e.g., the score loss metric 905, deviation loss metric 910, and stratification loss metric 920) (1115). The computing system may update the model (1120). The computing system may store weights and centroids (e.g., the centroids 720) of the model (1125).

Figure 11B:
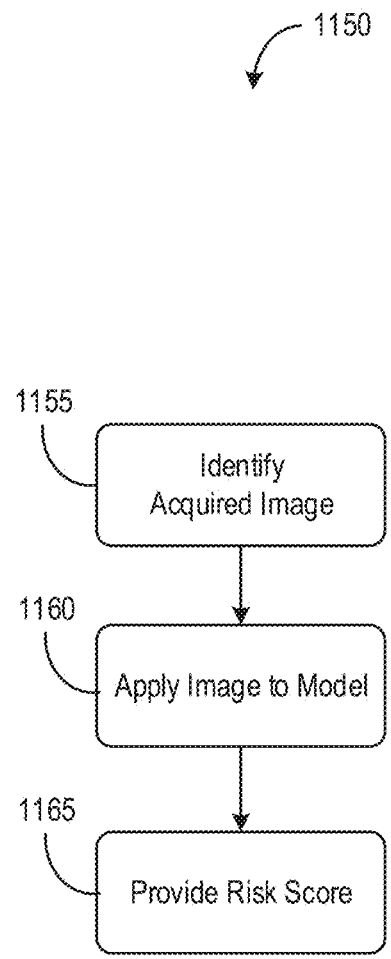
FIG. 11B depicts a flow diagram of a method of training models to determine scores indicative of times to events from biomedical images, in accordance with an illustrative embodiment.

Referring now to FIG. 11B, depicted is a flow diagram depicting a method 1250 of determining scores from biomedical images. The method 1150 may be implemented using the system 500 described herein in conjunction with FIGS. 5-10 or the system 1200 described herein in conjunction with FIG. 12. Under method 1150, a computing system (e.g., the image processing system 505) may identify an acquired image (e.g., the image 1015) (1155). The computing system may apply the image to a model (e.g., the risk assessment model 535) (1160). The computing system may provide a risk score (e.g., the estimated risk scores 1025) (1165).

C. Computing and Network Environment

Figure 12:
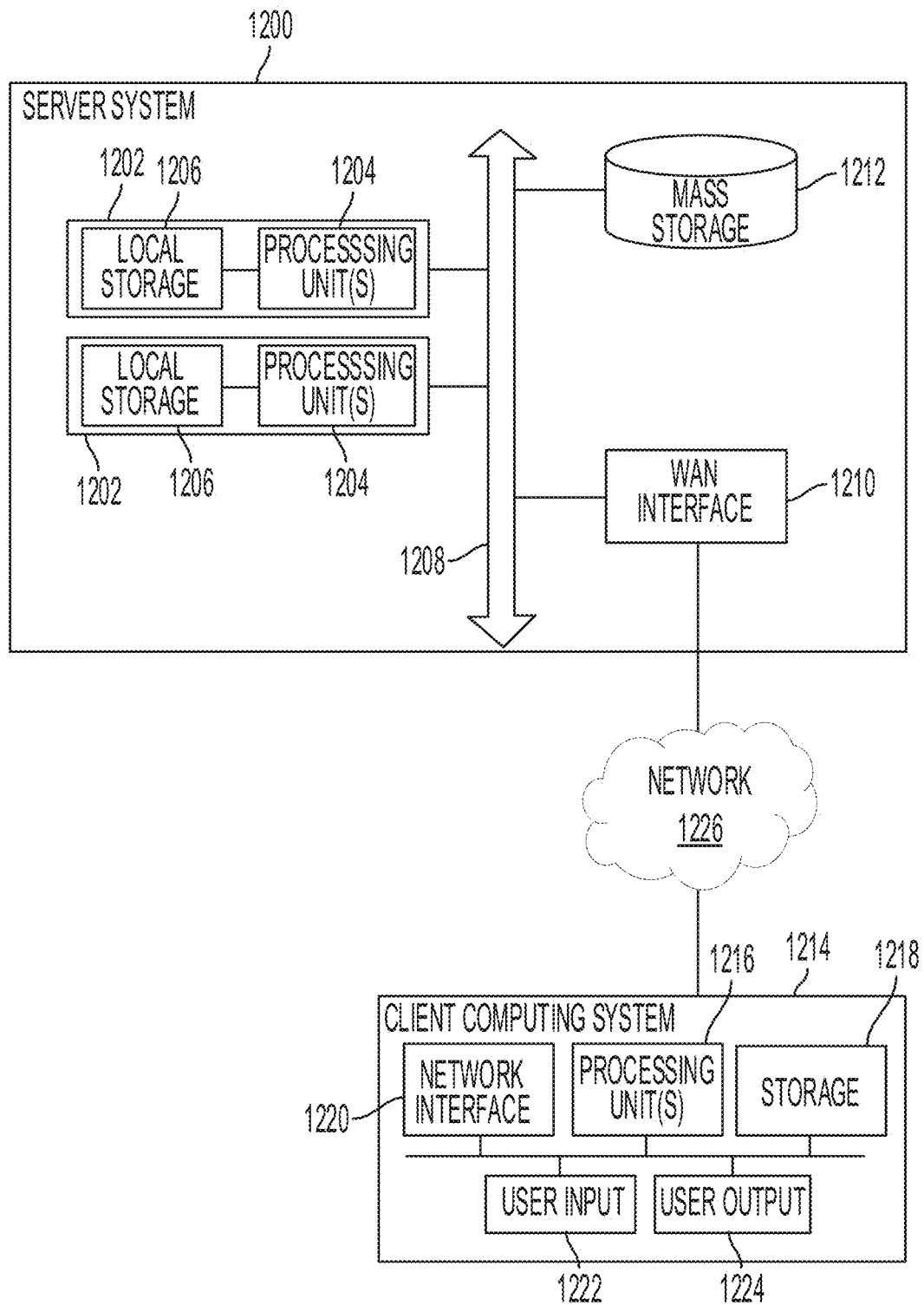
FIG. 12 depicts a block diagram of a server system and a client computer system in accordance with an illustrative embodiment

Various operations described herein can be implemented on computer systems. FIG. 12 shows a simplified block diagram of a representative server system 1200, client computing system 1214, and network 1226 usable to implement certain embodiments of the present disclosure. In various embodiments, server system 1200 or similar systems can implement services or servers described herein or portions thereof. Client computing system 1214 or similar systems can implement clients described herein. The system 500 described herein can be similar to the server system 1200. Server system 1200 can have a modular design that incorporates a number of modules 1202 (e.g., blades in a blade server embodiment); while two modules 1202 are shown, any number can be provided. Each module 1202 can include processing unit(s) 1204 and local storage 1206.

Processing unit(s) 1204 can include a single processor, which can have one or more cores, or multiple processors. In some embodiments, processing unit(s) 1204 can include a general-purpose primary processor as well as one or more special-purpose co-processors such as graphics processors, digital signal processors, or the like. In some embodiments, some or all processing units 1204 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1204 can execute instructions stored in local storage 1206. Any type of processors in any combination can be included in processing unit(s) 1204.

Local storage 1206 can include volatile storage media (e.g., DRAM, SRAM, SDRAM, or the like) and/or non-volatile storage media (e.g., magnetic or optical disk, flash memory, or the like). Storage media incorporated in local storage 1206 can be fixed, removable or upgradeable as desired. Local storage 1206 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 1204 need at runtime. The ROM can store static data and instructions that are needed by processing unit(s) 1204. The permanent storage device can be a non-volatile read-and-write memory device that can store instructions and data even when module 1202 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 1206 can store one or more software programs to be executed by processing unit(s) 1204, such as an operating system and/or programs implementing various server functions such as functions of the system 500 of FIG. 5 or any other system described herein, or any other server(s) associated with system 500 or any other system described herein.

"Software" refers generally to sequences of instructions that, when executed by processing unit(s) 1204 cause server system 1200 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 1204. Software can be implemented as a single program or a collection of separate programs or program modules that interact as desired. From local storage 1206 (or non-local storage described below), processing unit(s) 1204 can retrieve program instructions to execute and data to process in order to execute various operations described above.

In some server systems 1200, multiple modules 1202 can be interconnected via a bus or other interconnect 1208, forming a local area network that supports communication between modules 1202 and other components of server system 1200. Interconnect 1208 can be implemented using various technologies including server racks, hubs, routers, etc.

A wide area network (WAN) interface 1210 can provide data communication capability between the local area network (interconnect 1208) and the network 1226, such as the Internet. Technologies can be used, including wired (e.g., Ethernet, IEEE 1202.3 standards) and/or wireless technologies (e.g., Wi-Fi, IEEE 1202.11 standards).

In some embodiments, local storage 1206 is intended to provide working memory for processing unit(s) 1204, providing fast access to programs and/or data to be processed while reducing traffic on interconnect 1208. Storage for larger quantities of data can be provided on the local area network by one or more mass storage subsystems 1212 that can be connected to interconnect 1208. Mass storage subsystem 1212 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 1212. In some embodiments, additional data storage resources may be accessible via WAN interface 1210 (potentially with increased latency).

Server system 1200 can operate in response to requests received via WAN interface 1210. For example, one of modules 1202 can implement a supervisory function and assign discrete tasks to other modules 1202 in response to received requests. Work allocation techniques can be used. As requests are processed, results can be returned to the requester via WAN interface 1210. Such operation can generally be automated. Further, in some embodiments, WAN interface 1210 can connect multiple server systems 1200 to each other, providing scalable systems capable of managing high volumes of activity. Other techniques for managing server systems and server farms (collections of server systems that cooperate) can be used, including dynamic resource allocation and reallocation.

Server system 1200 can interact with various user-owned or user-operated devices via a wide-area network such as the Internet. An example of a user-operated device is shown in FIG. 12 as client computing system 1214. Client computing system 1214 can be implemented, for example, as a consumer device such as a smartphone, other mobile phone, tablet computer, wearable computing device (e.g., smart watch, eyeglasses), desktop computer, laptop computer, and so on.

For example, client computing system 1214 can communicate via WAN interface 1210. Client computing system 1214 can include computer components such as processing unit(s) 1216, storage device 1218, network interface 1220, user input device 1222, and user output device 1224. Client computing system 1214 can be a computing device implemented in a variety of form factors, such as a desktop computer, laptop computer, tablet computer, smartphone, other mobile computing device, wearable computing device, or the like.

Processing unit(s) 1216 and storage device 1218 can be similar to processing unit(s) 1204 and local storage 1206 described above. Suitable devices can be selected based on the demands to be placed on client computing system 1214; for example, client computing system 1214 can be implemented as a "thin" client with limited processing capability or as a high-powered computing device. Client computing system 1214 can be provisioned with program code executable by processing unit(s) 1216 to enable various interactions with server system 1200.

Network interface 1220 can provide a connection to the network 1226, such as a wide area network (e.g., the Internet) to which WAN interface 1210 of server system 1200 is also connected. In various embodiments, network interface 1220 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1222 can include any device (or devices) via which a user can provide signals to client computing system 1214; client computing system 1214 can interpret the signals as indicative of particular user requests or information. In various embodiments, user input device 1222 can include any or all of a keyboard, touch pad, touch screen, mouse or other pointing device, scroll wheel, click wheel, dial, button, switch, keypad, microphone, and so on.

User output device 1224 can include any device via which client computing system 1214 can provide information to a user. For example, user output device 1224 can include a display to display images generated by or delivered to client computing system 1214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 1224 can be provided in addition to or instead of a display. Examples include indicator lights, speakers, tactile "display" devices, printers, and so on.

Some embodiments include electronic components, such as microprocessors, storage and memory that store computer program instructions in a computer-readable storage medium. Many of the features described in this specification can be implemented as processes that are specified as a set of program instructions encoded on a computer-readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1204 and 1216 can provide various functionality for server system 1200 and client computing system 1214, including any of the functionality described herein as being performed by a server or client, or other functionality.

It will be appreciated that server system 1200 and client computing system 1214 are illustrative and that variations and modifications are possible. Computer systems used in connection with embodiments of the present disclosure can have other capabilities not specifically described here. Further, while server system 1200 and client computing system 1214 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to the specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer-readable storage media; suitable media include magnetic disk or tape, optical storage media such as compact disk (CD) or DVD (digital versatile disk), flash memory, and other non-transitory media. Computer-readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method of determining scores from biomedical images, comprising:
    identifying, by a computing system, a plurality of tiles in a first biomedical image derived from a sample of a subject, each tile of the plurality of tiles corresponding to one or more features of the sample;
    applying, by the computing system, the plurality of tiles to a machine learning (ML) model, the ML model comprising:
        an encoder having a first plurality of weights to generate a plurality of feature vectors based on the plurality of tiles,
        a clusterer having a plurality of centroids defined in a feature space to select a subset of feature vectors from the plurality of feature vectors, and
        an aggregator having a second plurality of weights to combine the subset of feature vectors to determine a first score indicative of a time to an event for the subject resulting from the one or more features of the sample from which the first biomedical image is derived, and
    wherein the model is trained in accordance with a loss derived from a second plurality of scores determined for a corresponding second plurality of biomedical images; and
    storing, by the computing system, in one or more data structures, an association between the score and the first biomedical image.

2. The method of claim 1, further comprising providing, by the computing system, information based on the association between the score and the first biomedical image.

3. The method of claim 1, further comprising obtaining, by the computing system, the first biomedical image of the sample on a slide acquired via a histopathological image preparer.

4. The method of claim 1, further comprising receiving, by the computing system via a user interface, a selection of the plurality of tiles corresponding to the one or more features in the respective sample.

5. The method of claim 1, wherein the clusterer is to identify at least one feature vector to include in the subset of feature vectors based on a comparison between the at least one feature vector and a corresponding centroid of the plurality of centroids.

6. The method of claim 1, wherein the aggregator is to determine the first score indicative of a probability of survival of the subject by time resulting from the one or more features of the sample.

7. The method of claim 1, wherein the model is trained in accordance with a second loss based on a comparison between the second plurality of scores and a third plurality of scores identified for the second plurality of biomedical images in a training dataset.

8. A method of training models to determine scores from biomedical images, comprising:
identifying, by a computing system, a training dataset for each biomedical image of a plurality of biomedical image, comprising a plurality of tiles in the biomedical image derived from a respective sample of a corresponding subject, each tile of the plurality of tiles corresponding to one or more features in the respective sample;
applying, by the computing system, the plurality of tiles from each biomedical image to a machine learning (ML) model, the ML model comprising:
an encoder having a first plurality of weights to generate a plurality of feature vectors based on the plurality of tiles,
a clusterer having a plurality of centroids defined in a feature space to select a subset of feature vectors from the plurality of feature vectors, and
an aggregator having a second plurality of weights to combine the subset of feature vectors to determine a score indicative of a time to an event for the corresponding subject, and
determining, by the computing system, a loss based on the score determined for each of the plurality of biomedical images;
updating, by the computing system using the loss, at least one of the first plurality of weights of the encoder, the plurality of centroids of the clusterer, or the second plurality of weights of the aggregator; and
storing, by the computing system, in one or more data structures, the first plurality of weights of the encoder, the plurality of centroids of the clusterer, and the second plurality of weights of the aggregator.

9. The method of claim 8, wherein the training dataset further comprises a second score indicative of the time to the event for the corresponding subject resulting from the one or more features in the respective sample;
wherein determining the loss further comprises determining the loss based on a comparison between the score and the second score determined for the corresponding biomedical image.

10. The method of claim 8, further comprising identifying, by the computing system, from a plurality of scores comprising the score determined for each of the plurality of biomedical images, (i) a first value corresponding to a first subset of the plurality of scores and (ii) a second value corresponding to a second subset of the plurality of scores, and
wherein determining the loss further comprises determining the loss as a function of the first value and the second value.

11. The method of claim 8, wherein determining the loss further comprises determining the loss as a function of a modification of the plurality of centroids defined in the feature space of the clusterer.

12. The method of claim 8, wherein the clusterer is to identify at least one feature vector to include in the subset of feature vectors based on a comparison between the at least one feature vector and a corresponding centroid of the plurality of centroids.

13. The method of claim 8, wherein the aggregator is to determine the score indicative of a probability of survival of the subject by time resulting from the one or more features of the sample.

14. The method of claim 8, further comprising receiving, by the computing system via a user interface, for at least one of the plurality of biomedical images, a selection of the plurality of tiles corresponding to the one or more features in the respective sample.

15. A system for determining scores from biomedical images, comprising:
a computing system having one or more processors coupled with memory, configured to:
identify a plurality of tiles in a first biomedical image derived from a sample of a subject, each tile of the plurality of tiles corresponding to one or more features of the sample;
apply the plurality of tiles to a machine learning (ML) model, the ML model comprising:
an encoder having a first plurality of weights to generate a plurality of feature vectors based on the plurality of tiles,
a clusterer having a plurality of centroids defined in a feature space to select a subset of feature vectors from the plurality of feature vectors, and
an aggregator having a second plurality of weights to combine the subset of feature vectors to determine a first score indicative of a time to an event for the subject resulting from the one or more features of the sample from which the first biomedical image is derived, and
wherein the model is trained in accordance with a loss derived from a second plurality of scores determined for a corresponding second plurality of biomedical images; and
store, in one or more data structures, an association between the score and the first biomedical image.

16. The system of claim 15, wherein the computing system is further configured to provide information based on the association between the score and the first biomedical image.

17. The system of claim 15, wherein the computing system is further configured to obtain the first biomedical image of the sample on a slide acquired via a histopathological image preparer.

18. The system of claim 15, wherein the computing system is further configured to receive, via a user interface, a selection of the plurality of tiles corresponding to the one or more features in the respective sample.

19. The system of claim 15, wherein the clusterer is to identify at least one feature vector to include in the subset of feature vectors based on a comparison between the at least one feature vector and a corresponding centroid of the plurality of centroids.

20. The system of claim 15, wherein the aggregator is to determine the first score indicative of a probability of survival of the subject by time resulting from the one or more features of the sample.

* * * * *